United States Patent
Kato et al.

[11] Patent Number: 5,877,973
[45] Date of Patent: Mar. 2, 1999

[54] LOGIC OPERATION CIRCUIT AND CARRY LOOK AHEAD ADDER

[75] Inventors: Koji Kato, Nagoya; Harutsugu Fukumoto, Anjo; Hiroaki Tanaka, Okazaki, all of Japan

[73] Assignee: Denso Corporation, Kariya, Japan

[21] Appl. No.: 806,213

[22] Filed: Feb. 26, 1997

[30] Foreign Application Priority Data

Feb. 27, 1996 [JP] Japan .................................. 8-039601

[51] Int. Cl.⁶ .......................................................... G06F 7/50
[52] U.S. Cl. ...................................................... 364/787.02
[58] Field of Search ....................... 364/787.02, 787.03, 364/787.01

[56] References Cited

U.S. PATENT DOCUMENTS

| | | | |
|---|---|---|---|
| 4,761,760 | 8/1988 | Tomoji | 364/787.02 |
| 5,117,386 | 5/1992 | Persoon et al. | 364/787.02 |
| 5,357,457 | 10/1994 | Terane | 364/787.02 |
| 5,544,085 | 8/1996 | Sali | 364/787.02 |
| 5,701,504 | 12/1997 | Timko | 364/787.01 |

FOREIGN PATENT DOCUMENTS 520 298  12/1992  European Pat. Off. .
62-074129  4/1987  Japan .
5-006263  1/1993  Japan .
5-061643  3/1993  Japan .

OTHER PUBLICATIONS

"Design of CMOS VLSI", published by Baifukan, 1989 (with English abstract).

*Primary Examiner*—David H. Malzahn
*Attorney, Agent, or Firm*—Pillsbury Madison & Sutro LLP

[57] ABSTRACT

An 8-bit CLA adder is constructed for inputting 4 lower bits a3:0,b3:0 and 4 upper bits a7:4,b7:4 of two input signals to the two 4-bit full adders 2,12 and a carry c-1 to the lowest bit the full adder of the first-stage 2 to generate carries c3,c7 correspondint to the third and seventh bit of the input signals from a carry generation signal g7:0 and a carry propagation signal p7:0 generated by the both adders 2,12 and the carry c-1. The full adder of the second-stage 12 is constructed to add the 4 upper bits a7:4,b7:4 with setting a carry-in as 0 so as to generate a temporary summing signal sz7:4. A logical circuit 14 generates a true sum of 4 upper bits from a carry c3 to the third bit to the forth bit, a temporary sum sz7:4 and a carry propagation signal p7:4 generated by the full adder of the second-stage 12.

4 Claims, 9 Drawing Sheets

LOGIC OPERATION CIRCUIT AND CARRY LOOK AHEAD ADDER

BACKGROUND OF THE INVENTION

1. Field of the Invention

The present invention relates to a carry lookahead adder which is a binary digital arithmetical operation unit. The present invention also relates to a logical operation circuit suitable for use in the carry look-ahead adder.

2. Description of the Related Art

There has been heretofore known a ripple-carry adder which is used in a computer etc. The ripple-carry adder executes an addition of a given number of digits. The ripple-carry adder is constructed by sequentially connecting 1-bit full adders each for adding two 1-bit signals and a carry signal from a lower digit (carry-in) to output a sum and a carry signal to an upper digit (carry-out). The number of the 1-bit full adders corresponds to the number of digits (i.e. numbers of bits) of input signals to be added.

In the ripple-carry adder, before an addition in a certain digit place is started, it is necessary to determine a carry signal from the lower digit place. Thus, the operation time spent by the ripple-carry adder increases in proportion to the number of digits of input signals to be added. Therefore, the operation time of the ripple-carry adder lengthens as the number of processed bits increases.

In order to remove such a problem in the ripple-carry adder, it is known to apply a carry look-ahead system to an adder. According to the carry look-ahead system, before additions of bits of input signals to be added are implemented, each bit of the input signals is examined to generate a carry out.

In a typical carry look-ahead adder, the two input signals are divided into, for example, groups each consisting of 4 bits, and a carry-out to the next group is generated before the sum obtained in each group is outputted. The carry look-ahead adder is able to reduce the operation time (e.g. TOKKAIHEI 5-61643 patent publication).

One example of a conventional 32-bit carry look-ahead adder will be described hereafter with reference to FIG. 10.

It should be noted that, in the following description, an n bit indicates an n-th bit where the lowest bit is labeled as a 0 bit. In FIG. 10 and other Figs., among characters beginning with small character alphabets, characters such as a3:0 indicates a 3 bit to a 0 bit of a signal a.

In FIG. 10, there are 4-bit full adders (ADD: 4-bit ripple-carry adder) 30-0,30-1, . . . ,30-7, respectively. These 4-bit full adders 30-0 to 30-7 are provided for respective pairs of 4-bit signals a (a3:0,a7:4, . . . ,a31:28) and b (b3:0,b7:4, . . . ,b31:28) obtained by dividing two 32-bit input signals a31:0,b31:0 into 4-bit segments. The 4-bit full adders 30-0 to 30-7 receive 4-bit signals a,b of the corresponding groups and carry signals c (c-1,c3, . . . ,c27) from one lower digit than the lowest digit of the 4-bit signals a,b, and generate 4-bit carry generating signals g (g3:0, g7:4, . . . ,g31:28), 4-bit carry propagation signals p (p3:0, p7:0, . . . ,p31:28), and 4-bit summing signals s (s3:0, s7:4, . . . ,s31:28) by executing operation expressed in equations (1) to (4) indicated later.

In FIG. 10 and the following description, G[3], . . . ,G[31], P[3], . . . ,P[31] indicate 1-bit carry generation signals and carry propagation signals, respectively.

It should be noted that in the equations indicated later, the symbol "*" indicates logical AND operation, the symbol "xor" indicates logical EXCLUSIVE-OR operation, the symbol "+" indicates logical OR operation, and the suffix "n" indicates the position (the place) of each bit in the input signals a,b to the 4-bit full adders 30-0 to 30-7. In addition, the numeral "0" corresponds to the lowest bit (the lowest digit), and the symbol "cn−1" indicates a carry signal from an (n−1)-th bit necessary to obtain a sum sn of n-th bits within the 4-bit full adders 30-0 to 30-7.

The equations (1) to (4) are given as:

$$gn = (an) * (bn) \quad (1)$$

$$pn = (an) \, xor \, (bn) \quad (2)$$

$$sn = (pn) \, xor \, (cn-1) \quad (3)$$

$$cn = (gn) + (pn) * (cn-1) \quad (4)$$

Next, 4-bit carry generation/propagation signal generators (4GP) 32-0,32-1, . . . ,32-7 form carry look-ahead circuits of a first part of a hierarchy. The 4-bit carry generation/propagation signal generators 32-0 to 32-1, . . . ,32-7 are provided in correspondence with the 4-bit full adders 30-0 to 30-7, respectively. The 4-bit carry generation/propagation signal generator 32-0, 32-1, . . . ,32-7 generates 1-bit carry generation signals G[n+3] (G[3],G[7], . . . ,G[31]) and 1-bit carry propagation signals P[n+3] (P[3],P[7], . . . ,P[31]) by executing operation in the following equations (5),(6) in response to 4-bit carry generation signals g (g3:0,g7:4, . . . ,g31:28) and 4-bit carry propagation signals p (p3:0, p7:4, . . . ,p31:28) generated by the corresponding 4-bit full adders 30-0 to 30-7, respectively, when the 4-bit input signals a (a3:0,a7:4, . . . ,a31:28) and b (b3:0, b7:4, . . . ,b31:28) are grouped into blocks.

$$G[n+3] = (gn+3) + (pn+3) * (gn+2) + \quad (5)$$
$$(pn+3) * (pn+2) * (gn+1) + (pn+3) * (pn+2) * (pn+1) * (gn)$$

$$P[n+3] = (pn+3) * (pn+2) * (pn+1) * (\underline{pn}) \quad (6)$$

Further, in FIG. 10, carry look-ahead circuits 34-0, 34-1, . . . ,34-7 (1CLA,2CLA,3CLA,4CLA,1CLA,2CLA, 3CLA,4CLA) form a second part of the hierarchy.

The carry look-ahead circuits 34-0,34-1, . . . ,34-7 are provided in correspondence with the 4-bit full adders 30-0 to 30-7 and the carry generation/propagation signal generators 32-0 to 32-7.

Each of the carry look-ahead circuits from the first-stage to the fourth-stage (1CLA,2CLA,3CLA,4CLA) 34-0 to 34-3 receives a carry signal c-1 (i.e. a carry signal c-1 to the lowest digit of the 32-bit input signals a, b) to the lowest digit of the 4-bit full adder 30-0, carry generation signals G[n+3] (G[3],G[7],G[11],G[15]), and carry propagation signals P[n+3] (P[3],P[7],P[11], P[15]) generated by a circuit corresponding to each one within a carry generation/propagation generation circuit 32-0, 32-1, 32-2,or 32-3 and a circuit lower than that. In response to the received signals, each of the carry look-ahead circuits from the first-stage to the fourth-stage generates and outputs a carry signal c (i.e. each of carry signals (c3,c7,c11 ,c15) to be inputted to the 4-bit full adders 30-1 to 30-4 provided at the next-stages) from the uppermost bit of the 4-bit input signals a,b fed to the corresponding 4-bit full adders 30-0 to 30-3.

Likewise, each of the carry look-ahead circuits from the fifth-stage to the last (eighth)-stage (1CLA,2CLA,3CLA, 4CLA) 34-4 to 34-7 receives a carry signal C15 (i.e. a carry signal generated by the carry look-ahead circuit 34-3) inputted to the 4-bit full adder 30-4 of the fifth stage, carry generation signals G[n+3] (G[19],G[23],G[27],G[31]) and carry propagation signals P[n+3], (P[19],P[23],P[27],P[31])

generated by a circuit corresponding to each one within the carry generation/propagation signal generator 32-4 to 32-7. In response to the received signals, each of the carry look-ahead circuits from the fifth-stage to the last-stage generates and outputs a carry signal c (c19,c23,c27,c31) from the uppermost bits of the 4-bit input signals a,b to the corresponding 4-bit full adders 30-4 to 30-7. For example, carry signal c19 is generated by a combination of carry generation signal G[19], carry propagation signal P[19], and carry signal c15, and carry signal c31 is generated by a combination of carry generation signal G[31], carry propagation signals P[19], P[23], P[27], P[31], and carry signal c15. Then, carry signals c19,c23,c27 generated by the carry look-ahead circuits 34-4,34-5,34-6 other than that generated by the last-stage are inputted to the 4-bit full adders 30-5, 30-6,30-7 of the next stage, respectively.

Here, if the carry generation signals G[3],G[7],G[11],G[15] are expressed as G<0>,G<1>, . . . from the lower digit G[3] in that order and the carry propagation signals P[3],P[7],P[11],P[15] as P<0>,P<1>, . . . and the carry signal c-1 as Cin, each of the look-ahead circuits 34-0 to 34-3 generates the carry signal c (c3,c7,c11 ,c15) by executing the operation given in an equation (7) indicated later. Similarly, if the carry generation signals G[19],G[23],G[27],G[31] are expressed as G<0>,G<1>, . . . from the lower digit and the carry propagation signals P[19],P[23], P[27],P[31] as P<0>, P<1>, . . . from the lower digit P[19] in that order and the carry signal c15 as Cin, each of the carry look-ahead circuits 34-4 to 34-7 generates a carry signal c (c19,c23,c27,c31) by executing the operation given in the following equation (7):

$$c = G<y> + \\ P<y> * G<y-1> + \\ P<y> * P<y-1> * G<y-2> + \\ \vdots \\ P<y> * P<y-1> * \ldots * P<1> G<0> + \\ P<y> * P<y-1> * \ldots * P<1> * P<0> * Cin \quad (7)$$

Accordingly, for example, in the carry look-ahead circuit 34-0, a carry signal c3 is generated as shown by an equation (8) indicated later. In the carry look-ahead circuit 34-1, a carry signal c7 is generated as shown by an equation (9) indicated later. In the carry look-ahead circuit 34-2, a carry signal c11 is generated as shown by an equation (10) indicated later. In the carry look-ahead circuit 34-3, a carry signal c15 is generated as shown by an equation (11) below:

$$c3 = (G[3]) + (P[3]) * (c-1) \quad (8)$$

$$c7 = (G[7]) + (P[7]) * (G[3]) + (P[7]) * (P[3]) * (c-1) \quad (9)$$

$$c11 = (G[11]) + (P[11]) * (G[7]) + \\ (P[11]) * (P[7]) * (G[3]) + (P[11]) * (P[7]) * (P[3]) * (c-1) \quad (10)$$

$$c15 = (G[15]) + (P[15]) * (G[11]) + \\ (P[15]) * (P[11]) * (G[7]) + (P[15]) * (P[11]) * (P[7]) * (G[3]) + \\ (P[15]) * (P[11]) * (P[7]) * (P[3]) * (c-1) \quad (11)$$

Namely, as can be seen from the foregoing equations (1),(2),(5) to (11), a carry generating signal gn and a carry propagation signal pn depend on only the two input signals a,b, and thus, they can be obtained for each digit in parallel. What is more, by using only the carry generating signal gn, the carry propagating signal pn, and the carry signal c-1 inputted to the 4-bit full adder 30-0 of the lowest digit, it is possible to generate the carry signals c3,c7, . . . ,c27 to be inputted to the 4-bit full adders 30-1 to 30-7 other than that of the lowest digit.

In the 32-bit adder of FIG. 10, carry signals are fed to the 4-bit full adders 30-4 to 30-7 in advance as will be explained below. The carry generation/propagation signal generator 32-0 and the carry look-ahead circuit (1CLA) 34-0 cooperate to look ahead a carry c3 from the third bit (fourth digit) of the input signals a,b, and the carry c3 is inputted to the 4-bit full adder 30-1 of the second-stage.

The operations of carry generation/propagation signal generators 32-4 to 32-7 and carry look-ahead circuits 34-4 to 34-7, which correspond to the 4-bit full adders 30-4 to 30-7 from the fifth stage to the eighth-stage, are similar to the operations of those corresponding to the 4-bit full adders 30-0 to 30-3 from the first-stage to the four-stage.

The adder employing such a carry look-ahead method can shorten the calculation time as compared with a ripple carry adder because a carry signal from a lower digit can be inputted to the 4-bit full adder (ADD) 30 of the upper digit before the 4-bit full adder (ADD) 30 of the lower digit generates a sum.

There are, however, the following disadvantages even in the conventional adder employing the above-mentioned carry look-ahead method.

With reference to FIG. 10, a consideration will now be given of a portion that constitutes the 8 bit carry look-ahead adder enclosed by a dash-dot-line, that is, the portion consisting of the 4-bit full adders (ADD) 30-0,30-1, the carry generation/propagation signal generators (4GP) 32-0, 32-1, and carry look-ahead circuits (1CLA,2CLA) 34-0,34-1 from the first-stage to the second-stage.

In such a carry look-ahead adder (hereafter referred to as "CLA adder"), a time T required for calculating a sum s7 of the highest bit (the seventh bit) after the two 8-bit input signals a7:0,b7:0 and a carry signal c-1 from the lower digit are inputted, that is, a time T required for completing 8-bit addition, is expressed by the following equation (12). Here, the symbol "+" indicates addition in the equation (12) only.

$$T = t1 + t2 + t3 + t4 \quad (12)$$

where t1=(a time required for the generation of the 4-bit carry generation signal g3:0 and the 4-bit carry propagation signal p3:0 by the 4-bit full adder 30-0 of the first-stage);

t2=(a time required for the generation of the 1-bit carry generation signal G[3] and the 1-bit carry propagation signal P[3] by the carry generation/propagation signal generator 32-0);

t3=(a time required for the generation of the carry signal c3 by the carry look-ahead circuit 34-0 of the first-stage); and t4=(a time required for the full addition of 4 upper bits a7:4,b7:4 of the input signals a,b and for the generation of a sum on the basis of the carry signal c3 by the 4-bit full adder 30-1 of the second-stage).

That is to say, in the above conventional 8-bit CLA adder, the carry look-ahead adder circuit 34-0 of the first-stage generates a carry signal c3 for the 4-bit full adder 30-1 of the second-stage before the 4-bit full adder 30-0 of the first-stage completes the full addition of 4 lower bits a3:0,b3:0 (t1+t2+t3). Then, the 4-bit full adder 30-1 of the second-stage executes the full addition of 4 upper bits a7:4,b7:4 after the carry look-ahead circuit 34-0 of the first-stage generates a carry signal c3.

Accordingly, in the conventional CLA adder, as can be seen from the foregoing equation (12), although a carry signal from a lower digit to a upper digit can be quickly generated, the 4-bit full adder of an upper digit (ADD) 30 is required to execute the full addition after a carry signal from a lower digit is determined.

Therefore, there is a limit to reduction of the calculation time required for the generation of the summing signal of full bits.

The present invention is made in consideration of these problems and disadvantages. An object of the present invention is to provide a carry look-ahead adder capable of further shortening the calculation time. Another object of the present invention is to provide a logical operation circuit for use in the carry look-ahead adder.

SUMMARY OF THE INVENTION

The logical operation circuit after the present invention is provided to attain the above objects. The logical operation circuit operates as follows. Two input signals to be added are fed, and a carry signal from one lower digit than the lowest digit of the input signals is fed. A summing signal is obtained by adding input signals together with the carry signal. A carry generation signals is generated which is a logical AND of both the bits of each digit place. A carry propagation signal is generated which is an EXCLUSIVE-OR of both the bits of each digit place.

At first, the plural-bit full adder receives both the input signals, and generates a carry signal and a carry propagation signal for each digit place of the input signals. The plural-bit full adder adds the input signals on the assumption that a carry to the lowest digit of the input signals is not present (in other words, on the assumption that a carry signal from one lower digit than the lowest digit of the input signals is 0). The plural-bit full adder outputs its result as a temporary summing signal.

Then, the summing signal generator receives a temporary summing signal and a carry propagation signal generated by the plural-bit full adder, and a carry signal from one lower digit than the lowest digit of the input signals. The summing signal generator generates a logical AND from one lower bit to the lowest bit corresponding to a temporary summing signal bit within a carry propagation signal, a logical AND with a carry signal from the lowest digit, and an EXCLUSIVE-OR with a temporary summing signal bit for each bit of temporary summing signal, and outputs the generated EXCLUSIVE-OR as a true summing signal (i.e. a summing signal obtained by adding the input signals together with a carry signal from a lower digit).

The generation of summing signals in the logical operation circuit will be specifically described hereafter. First, in the full addition of the two plural-bit input signals a,b , a carry $cn-1$ from the $(n-1)$-th bit required for obtaining the n-th bit sum sn when the lowest bit is set as 0-th bit is given as a later-indicated equation (13) based on the foregoing equation (4). Here, a carry signal from one lower digit than the lowest digit of the input signals a,b (i.e. a carry signal inputted from the external) is expressed as Cm. In the later-indicated equation (13), g and p denote a carry generation signal and a carry propagation signal corresponding to each bit of the input signals a,b and being obtained by the operation of the foregoing equations (1),(2).

Then, the n-th bit sum sn is obtained by the operation of the foregoing equation (3) from a carry $cn-1$ from the $(n-1)$-th bit and a carry generation signal pn of the n-th bit.

$$cn-1 = gn-1 + \qquad (13)$$
$$(pn-1)*(gn-2) +$$
$$(pn-1)*(pn-2)*(gn-3) +$$
$$\vdots$$
$$(pn-1)*(pn-2)*\ldots*(p1)*(g0) +$$
$$(pn-1)*(pn-2)*\ldots*(p1)*(P0)*(Cm)$$

In the equation (13), a term relating to a carry signal Cm inputted from the exterior is only the lowest one. A carry signal $c0n-1$ from $(n-1)$-th bit is given by the following equation (14) from the equation (13) when the carry signal Cm is 0.

$$c0n-1 = gn-1 + \qquad (14)$$
$$(pn-1)*(gn-2) +$$
$$(pn-1)*(pn-2)*(gn-3) +$$
$$\vdots$$
$$(pn-1)*(pn-2)*\ldots*(p1)*(g0).$$

Therefore, when the carry signal Cm from one lower digit than the lowest digit of the input signals a,b is 0, that is, when a carry to the lowest digit of the input signals a,b is not present, the n-th bit sum szn is given by the following equation (15) from the foregoing equation (3) and this sum szn becomes the n-th bit of the temporary summing signal.

$$szn=(pn)xor(c0n-1) \qquad (15)$$

As can be seen from the equations (3),(13) to (15), to obtain a true sum sn by combining a temporary sum szn and the external carry signal Cm, it is good to execute an EXCLUSIVE-OR of the lowest term of the equation (13) and the temporary sum szn as indicated in the following equation (16).

$$sn=(szn)xor\{(pn-1)*(pn-2)*\ldots*(p1)*(p0)*(Cm)\} \qquad (16)$$

The logical operation circuit according to the present invention does not generate a summing signal directly from the input signals and a carry signal from the lower digit by full addition, and thus differs from the 4-bit full adder (the 4-bit ripple-carry adder) 30 shown in FIG. 10. In the logical operation circuit according to the present invention, the plural-bit adder generates a temporary summing signal being a addition of the input signals while a carry signal from a lower digit is taken as 0. Afterwards, the summing signal generator generates a true summing signal from the temporary summing signal, the carry propagation signal, and the externally-inputted carry signal from the lower digit by executing the operation of the foregoing equation (16) for each bit of temporary summing signal.

According to the logical operation circuit after the present invention, the temporary summing signal can be generated previously by the plural-bit full adder while a carry signal from the exterior is not yet inputted (determined). The true summing signal can be generated by only the execution of the operation of the foregoing equation (16) by the summing signal generator after a carry summing signal is inputted (determined). Especially, the summing signal generation time can be shortened as compared with the case where the full addition is executed after a carry signal is inputted, since the operation of the foregoing equation (16) can be executed in parallel for each bit of the temporary summing signal.

Accordingly, if the logical operation circuit is used in, for example, the 8-bit carry look-ahead adder enclosed by the dash-dot-line in FIG. 10 in place of the 4-bit full adder (ADD) 30-1 of the second-stage, the operation time required for calculating an 8-bit summing signal can be shortened.

As previously explained, in the conventional carry look-ahead adder, the 4-bit full adder of the next-stage 30-1 starts execution of the 4-bit full addition after the carry look-ahead circuit 34-0 of the preceding-stage generates a carry signal c3. On the other hand, in the logical operation circuit after the present invention, the plural-bit full adder can generate a temporary summing signal for the time until a carry signal c3 is generated by the carry look-ahead circuit 34-0 of the preceding-stage. After the carry signal c3 is generated by the carry look-ahead circuit 34-0 of the preceding-stage, the true summing signal can be generated by only the execution of the operation of the foregoing equation (16) by the summing signal generator. In this example, a time T required for calculating a sum s7 of the uppermost bit is equal to the value resulting from replacing the term of the time t4 by the time t4' required for the equation (16) in the foregoing equation (12). Thus, the operation time can be shortened by the difference (t4–t4') therebetween.

Next, the carry look-ahead adder after the present invention comprises first operation circuits and second operation circuits, which are provided in correspondence with respective groups obtained by dividing the two input signals into predetermined plural-bits.

Each first operation circuit receives the plural-bit input signals of a corresponding group and a carry signal from one lower digit than the lowest digit of the input signals. Each first operation circuit generates a summing signal obtained by adding the input signals together with the carry signal, and generates a carry generation signal which is a logical AND of both the bits of each digit place and a carry propagation signal which is an EXCLUSIVE-OR of both the bits of each digit place of the input signals.

The second operation circuit generates a carry signal to be inputted to each first operation circuit other than the first operation circuit corresponding to the group of the lowest digit from a carry signal inputted to the first operation circuit corresponding to the group of the lowest digit among the groups of the input signals, a carry propagation signal generated by each first operation circuit, and a carry generation signal generated by each first operation circuit. The second operation circuit outputs the generated carry signals to the corresponding first operation circuit.

Namely, in the carry look-ahead adder after the present invention, each first operation circuit plays the same role, for example, as each 4-bit full adder (ADD) 30-0,30-1, . . . ,30-7 shown in FIG. 10, and the second operation circuit plays the same role, for example, as the whole circuit portion consisting of carry generation/propagation signal generators (4GP) 32-0,32-1, . . . ,32-7 and carry look-ahead circuits (1CLA,2CLA,3CLA,4CLA,1CLA,2CLA,3CLA,4CLA) 34-0,34-1, . . . ,34-7.

Especially, in the carry look-ahead adder after the present invention, each first operation circuit is not constructed by the mere plural-bit full adder but by the logical operation circuit after the present invention.

Therefore, according to the carry look-ahead adder after the present invention, as described above, an additive operation time can be shortened since each first operation circuit generates a summing signal after a carry signal (i.e. a carry signal from the lowest digit) is generated by the second operation circuit.

On the other hand, in the carry look-ahead adder of the third embodiment, all of the first operation circuits are not formed by the logical operation circuit after the present invention, but only a predetermined number of first operation circuits among plural first operation circuits are formed by the logical operation circuit of the present invention, and other first operation circuits are constructed by the second plural-bit full adder (i.e. the conventional circuit) which generates a carry generation signal, a carry propagation signal, and a summing signal in response to the input signals and a carry signal.

Furthermore, in the carry look-ahead adder of the third embodiment, the first operation circuit consisting of the logical operation circuit after the present invention receives the input signals higher in digit places than the input signals fed to the other first operation circuit.

Namely, as described above, the logical operation circuit after the present invention is superior to the above conventional circuit (the second plural-bit full adder) in that a summing signal is generated after a carry signal from the lower digit is determined without starting the full addition. In the carry look-ahead adder of this type, when the second operation circuit generates a carry signal for each first operation circuit, the generation (determination) of the carry signal corresponding to the input signals of a higher digit place tends to be more delayed.

Accordingly, in the carry look-ahead adder of the third embodiment, the logical operation circuit after the present invention is used for the first logical operation circuit of an upper digit which undergoes a delay of determination of the carry signal. Thus, according to the carry look-ahead adder of the third embodiment, additive operation time can be shortened while keeping an increase in components of circuit (increased components due to addition of the summing signal generator) to a minimum due to use of the logical operation circuit after the present invention.

DESCRIPTION OF THE PREFERRED EMBODIMENTS

The embodiments of the present invention will be hereafter described with reference to the accompanying drawings. The present invention may have many variations without being restricted to the under-mentioned embodiments as far as they come into the technical scope of the present invention.

1. First Embodiment

Figure 1:
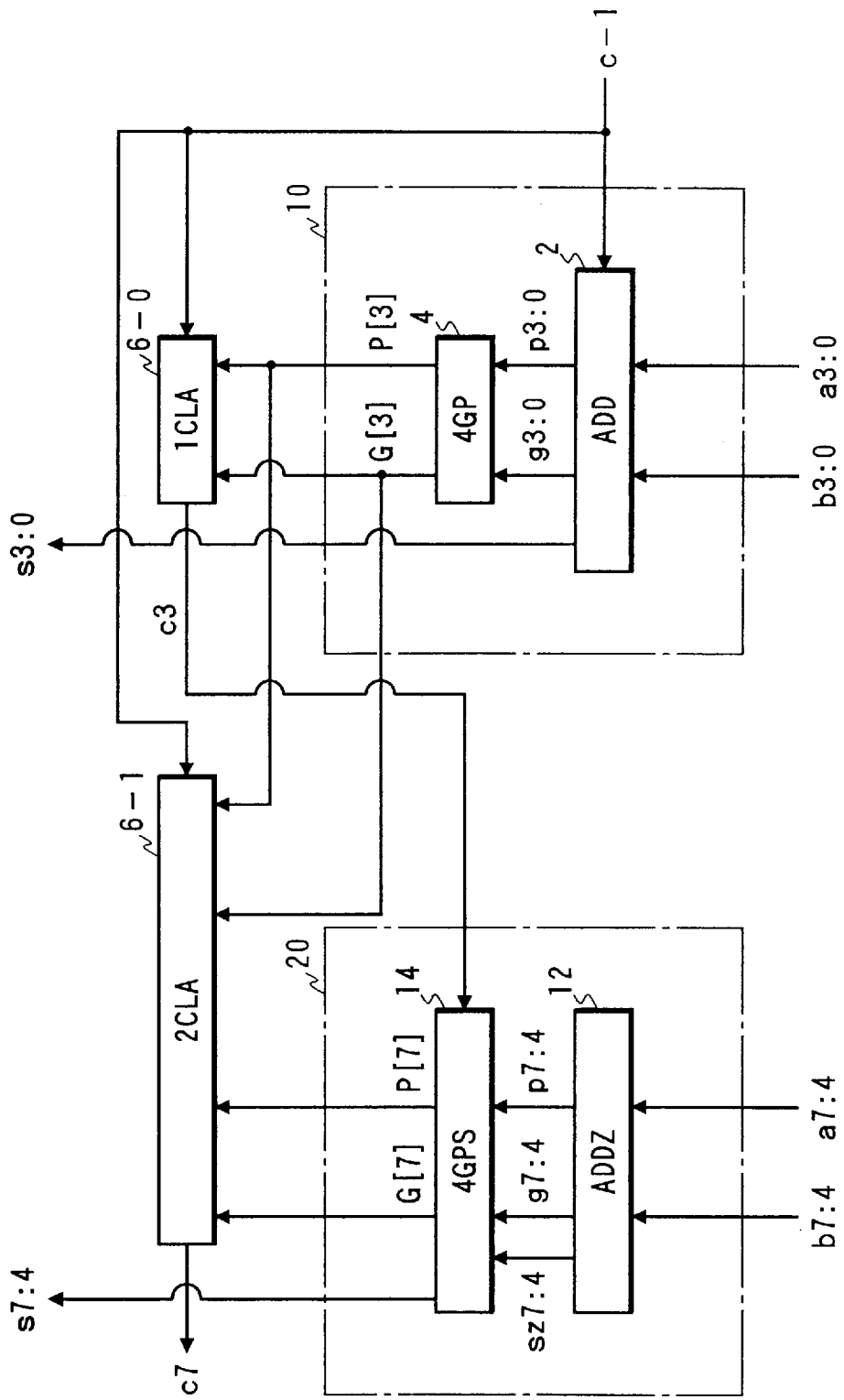
FIG. 1 is a block diagram of the 8-bit carry look-ahead adder of the first embodiment.

FIG. 1 is a block diagram illustrating the 8-bit carry look-ahead adder (hereafter referred to as the "8-bit CLA adder") of the first embodiment of the present invention. The 8-bit CLA adder of the present invention receives the two 8-bit input signals a7:0,b7:0 from the zero-th bit to the seventh bit and a carry signal (carry-in) c-1 from the external −1-th bit. The 8-bit CLA adder executes the full addition of the input signals a7:0,b7:0 together with the carry signal c-1, and outputs an 8-bit summing signal s7:0 and a carry signal (carry-out at the highest bit) c7 from the seventh bit.

As shown in FIG. 1, the 8-bit CLA adder of this embodiment comprises a 4-bit full adder (ADD) 2 which receives 4 lower bits a3:0,b3:0 of the input signals a7:0,b7:0 and an external carry signal c-1. The 4-bit full adder 2 generates a carry generation signal g3:0, a 4-bit carry propagation signal p3:0, and a summing signal s3:0 by executing the operation of the foregoing equations (1) to (4). The 8-bit CLA adder of FIG. 1 includes a 4-bit carry generation/propagation signal generator (4GP) 4 which receives the 4-bit carry generation signal g3:0 and the carry propagation signal p3:0. The 4-bit carry generation/propagation signal generator 4 generates a 1-bit carry generation signal G[3] and 1-bit carry propagation signal P[3] by executing the operation of the foregoing equations (5),(6) while getting together 4 lower bits a3:0,b3:0 of the input signals a7:0,b7:0 into one block. The 8-bit CLA adder of FIG. 1 also includes a carry look-ahead circuit (1CLA) 6-0 which receives the carry generation signal G[3], the carry propagation signal P[3], and the carry signal c-1 inputted to the 4-bit full adder 2. The carry look-ahead circuit 6-0 generates a carry signal C3 from the third bit of the input signals a7:0,b7:0 by executing the operation of the foregoing equation (8).

In addition, the 8-bit CLA adder of this embodiment comprises a 4-bit full adder (ADDZ) 12 which receives 4 upper bits a7:4,b7:4 of the input signals a7:0,b7:0. The 4-bit full adder 12 generates a 4-bit carry generation signal g7:4 and a 4-bit carry propagation signal p7:4 by executing the operation of the foregoing equations (1),(2). Also, the 4-bit full adder 12 generates a 4-bit temporary summing signal sz7:4 by executing the operation of the foregoing equations (3),(4) on the assumption that a carry to the lowest digit of the input signals a7:4,b7:4 is not present (in other words, a carry signal c3 is 0). The 8-bit CLA adder of FIG. 1 further includes a logic circuit (4GPS) 14 which receives the carry generation signal g7:4, the carry propagation signal p7:4, the carry signal c3, and the temporary summing signal sz7:4. The logic circuit 14 generates a 1-bit carry generation signal G[7] and a 1-bit carry propagation signal P[7] by executing the operation of the foregoing equations (5),(6) when getting together 4 upper bits a7:4,b7:4 of the input signals a7:0,b7:0 into one block. The logic circuit 14 also generates a 4-bit true summing signal s7:4 by executing the operation of the foregoing equation (16). In addition, the 8-bit CLA adder of FIG. 1 includes a carry look-ahead circuit (2CLA) 6-1 which receives the carry generation signal G[7], the carry propagation signal P[7], the carry generation signal G[3], the carry propagation signal P[3], and the carry signal c-1. The carry look-ahead circuit 6-1 generates a carry signal c7 from the seventh bit of the input signals a7:0,b7:0 by executing the operation of the foregoing equation (9).

Moreover, the components of the 8 bit CLA adder are connected in the following manner. Input lines for 4 lower bits a3:0,b3:0 of the input signals a7:0,b7:0 and the externally-inputted carry signal c-1 are connected to the 4-bit full adder (ADD) 2. Output lines for the 4-bit carry generation signal g3:0 and the 4-bit carry propagation signal p3:0 of the 4-bit full adder (ADD) 2 are connected to the 4-bit carry generation/propagation signal generator (4GP) 4. The true summing signal is outputted to the exterior as an s3:0. An output line for the 1-bit carry generation signal G[3] of the carry generation signal generator (4GP) 4 is divided into two paths: one is connected to the carry look-ahead circuit (1CLA) 6-0 and the other is connected to the carry look-ahead circuit (2CLA) 6-1. An output line for the 1-bit carry propagation signal P[3] is also divided into two paths: one is connected to the carry look-ahead circuit (1CLA) 6-0 and the other is connected to the carry look-ahead circuit (2CLA) 6-1. An input line for the externally-inputted carry signal c-1 is connected to the carry look-ahead circuit (1CLA) 6-0. An output line for the carry c3 of the same is connected to the summing signal generator (4GPS) 14.

Similarly, input lines for 4 upper bits a7:4,b7:4 of both input signals a7:0,b7:0 are connected to the 4-bit full adder (ADDZ) 12. Output lines for the 4-bit carry generation signal g7:4, the carry propagation signal p7:4, and the temporary summing signal sz7:4 of the 4-bit full adder (ADDZ) 12 are connected to the summing signal generator (4GPS) 14. Output lines for the 1-bit carry generation signal G[3] and the carry propagation signal P[3] of the summing signal generator (4GPS) 14 are connected to the carry look-ahead circuit (2CLA) 6-1. The true summing signal is outputted to the exterior as an s7:4. An input line for the externally-inputted carry signal c-1 is connected to the carry look-ahead circuit (2CLA) 6-1, whose output is outputted to the exterior as a c7.

Figure 2:
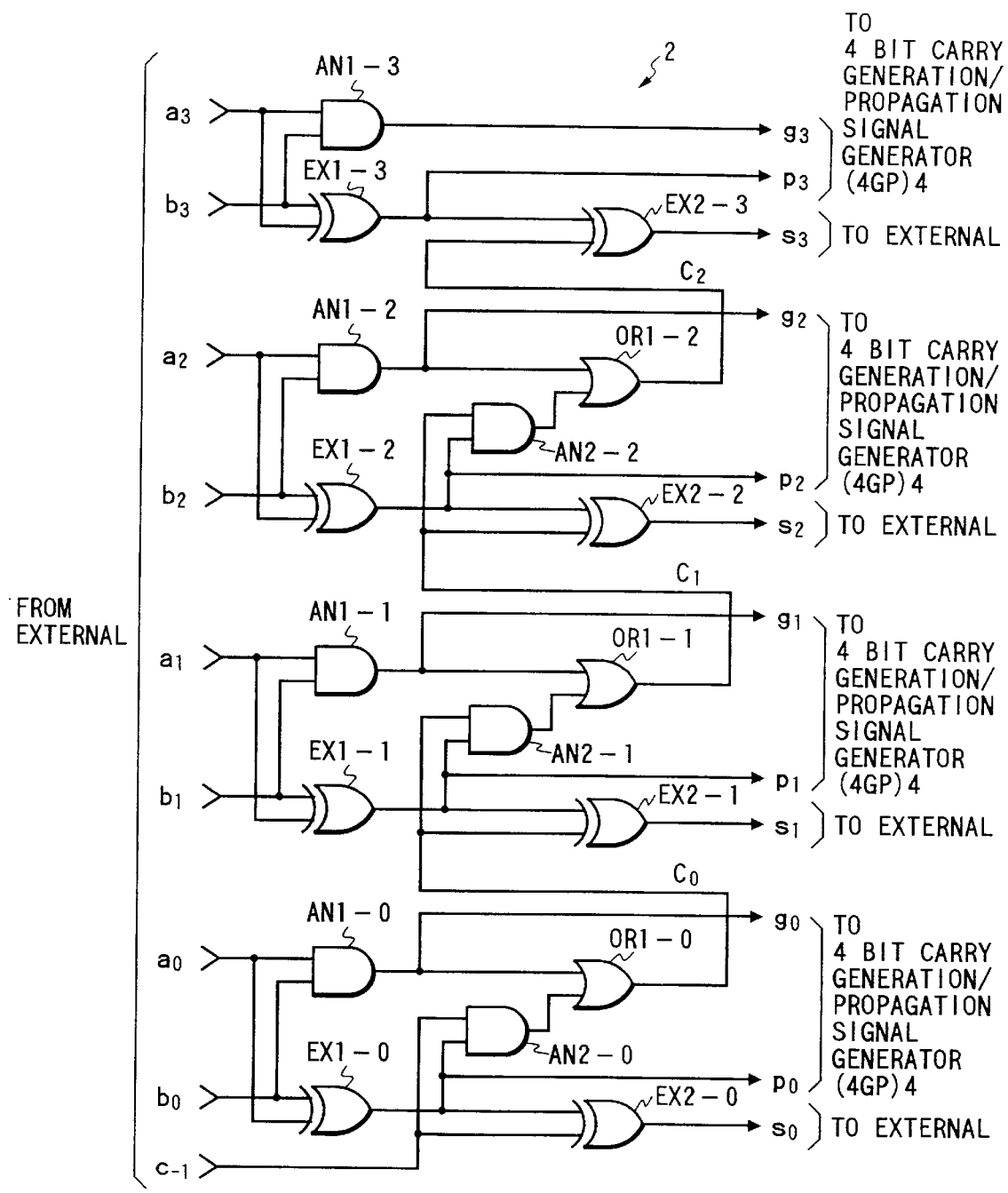
FIG. 2 is a circuit diagram illustrating an internal structure of the first 4-bit full adder (ADD) of the first embodiment (ADD) in FIG. 1.

FIG. 2 is a circuit diagram illustrating an internal structure of the first 4-bit full adder (ADD) 2 of the first embodiment in FIG. 1. The 4-bit full adder of the first-stage (ADD) 2 to which 4 lower bits a3:0,b3:0 of the input signals a7;0,b7:0 are fed is similar to the 4-bit full adder 30 in the conventional CLA adder shown in FIG. 10, and is constructed as shown in, for example, FIG. 2. In FIG. 2, numerals (n=0 to 3) attached to the back of symbol "-" indicate that they correspond to an n-th bit within the externally-inputted 4-bit input signals a,b when the lowest bit is set as a zero-th bit.

As shown in FIG. 2, the 4-bit full adder (ADD) 2 comprises four 1-bit full adders consisting of AND gate AN1-n for outputting logical products of n-th bits an,bn of the input signals a,b as carry generation signals gn, EXCLUSIVE-OR gates EX1-n for outputting EXCLUSIVE-OR of n-th bits an,bn of the input signal as carry propagation signals pn, EXCLUSIVE-OR gates EX2-n for outputting EXCLUSIVE-OR of the carry propagation signals pn and carry signals cn−1 from the (n−1) bits as sums cn of n-th bit, AND gates AN2-n for outputting logical products of the carry propagation signals pn and the carry signals cn−1 from (n−1)th bits, and OR gates OR1-n for outputting logical OR of outputs of the AND gates AN2-n and the carry generation signals gn as carry signals cn from n-th bits.

The 1-bit full adders are connected and designed in the following manner. An input line for the lower bit a0 of the input signal is connected to a first input terminal of the AND gate AN1-0 and a second input terminal of the EXCLUSIVE-OR gate EX1-0. An input line for the lower bit b0 of the input signal is connected to a second input terminal of the AND gate AN1-0 and a first input terminal of the EXCLUSIVE-OR gate EX1-0. An input line for the carry signal c-1 of the first-stage is divided into two paths:

one is connected to a first input terminal of the AND gate AN2-0 and the other is connected to a second input terminal of the EXCLUSIVE-OR gate EX2-0. An output line for the AND gate AN1-0 is divided into two paths: one is outputted to the 4-bit carry generation/propagation signal generator (4GP) 4 as a g0 and the other is connected to a first input terminal of the OR gate OR1-0. An output line for the EXCLUSIVE-OR gate EX1-0 is divided into three paths: the first is connected to a second input terminal of the AND gate AN2-0, the second is outputted to the carry generation/propagation signal generator (4GP) 4 as a p0, the third is connected to a first input terminal of the EXCLUSIVE-OR gate EX2-0. An output line for the EXCLUSIVE-OR gate EX2-0 is outputted to the exterior as an s0. An output line for the AND gate AN2-0 is connected to a second input terminal of the OR gate OR1-0. An output line for the OR gate OR1-0 is divided into two paths: one is connected to a first input terminal of the AND gate AN2-1 of the 1-bit full adder and the other is connected to a second input terminal of the EXCLUSIVE-OR gate EX2-1 of the second-stage.

An input line for the lower bit a1 of the input signal is connected to a first input terminal of the AND gate AN1-1 and a second input terminal of the EXCLUSIVE-OR gate EX1-1. An input line for the lower bit b1 of the input signal is connected to a second input terminal of the AND gate AN1-1 and a first input terminal of the EXCLUSIVE-OR gate EX1-1 of the second-stage. An output line for the AND gate AN1-1 is divided into two paths: one is outputted to the 4-bit carry generation/propagation signal generator (4GP) 4 as a g1 and the other is connected to a first input terminal of the OR gate OR1-1. An output line for the EXCLUSIVE-OR gate EX1-1 is divided into three paths: the first is connected to a second input terminal of the EXCLUSIVE-OR gate EX2-1, the second is outputted to the carry generation/propagation signal generator (4GP) 4 as a p1, and the third is connected to a second input terminal of the AND gate AN2-1. An output line for the EXCLUSIVE-OR gate EX2-1 is outputted to the exterior as an s1. An output line for the AND gate AN2-1 is connected to a second input terminal of the OR gate OR1-1. An output line for the OR gate OR1-1 is divided into two paths: one is connected to a first input terminal of the AND gate AN2-2 of the 1-bit full adder and the other is connected to a second input terminal of the EXCLUSIVE-OR gate EX2-2 of the third-stage.

An input line for the lower bit a2 of the input signal is connected to a first input terminal of the AND gate AN1-2 and a second input terminal of the EXCLUSIVE-OR gate EX1-2. An input line for the lower bit b2 of the input signal is connected to a second input terminal of the AND gate AN1-2 and a first input terminal of the EXCLUSIVE-OR gate EX1-2 of the third-stage. An output line for the AND gate AN1-2 is divided into two paths: one is outputted to the 4-bit carry generation/propagation signal generator (4GP) 4 as a g2 and the other is connected to a first input terminal of the OR gate OR1-2. An output line for the EXCLUSIVE-OR gate EX1-2 is divided into three paths: the first is connected to a second input terminal of the AND gate AN2-2, the second is outputted to the carry generation/propagation signal generator (4GP) 4 as a p2, and the third is connected to a first input terminal of the EXCLUSIVE-OR gate EX2-2. An output line for the EXCLUSIVE-OR gate EX2-2 is outputted to the exterior as an s2. An output line for the AND gate AN2-2 is connected to a second input terminal of the OR gate OR1-2. An output line for the OR gate OR1-2 is connected to a second input terminal of the EXCLUSIVE-OR gate EX2-3 of the 1-bit full adder of the fourth-stage.

An input line for lower bit a3 of the input signal is connected to a first input terminal of the AND gate AN1-3 and a second input terminal of the EXCLUSIVE-OR gate EX1-3. An input line for the lower bit b3 of the input signal is connected to a second input terminal of the AND gate AN1-3 and a first input terminal of the EXCLUSIVE-OR gate EX1-3 of the fourth-stage. An output line for the AND gate AN1-3 is outputted to the 4-bit carry generation/propagation signal generator (4GP) 4 as a g3. An output line for the EXCLUSIVE-OR gate EX1-3 is divided into two paths: one is outputted to the 4-bit carry generation/propagation signal generator (4GP) as a p3 and the other is connected to a first input terminal of the EXCLUSIVE-OR gate EX2-3. An output line for the EXCLUSIVE-OR gate EX2-3 is outputted to the exterior as an s3.

Here, AND gate AN2-3 and OR gate OR1-3 of the fourth-stage are omitted because outputting of a carry signal to the next-stage is unnecessary.

In such a 4-bit full adder (ADD) 2, the operations of the equation (1) are executed by the AND gates A1-n. The operations of the equation (2) are executed by the EXCLUSIVE-OR gates EX1-n. The operations of the equation (3) are executed by the EXCLUSIVE-OR gates EX2-n. The operations of the equation (4) are executed by the AND gates AN2-n and the OR gates OR1-n.

Figure 3:
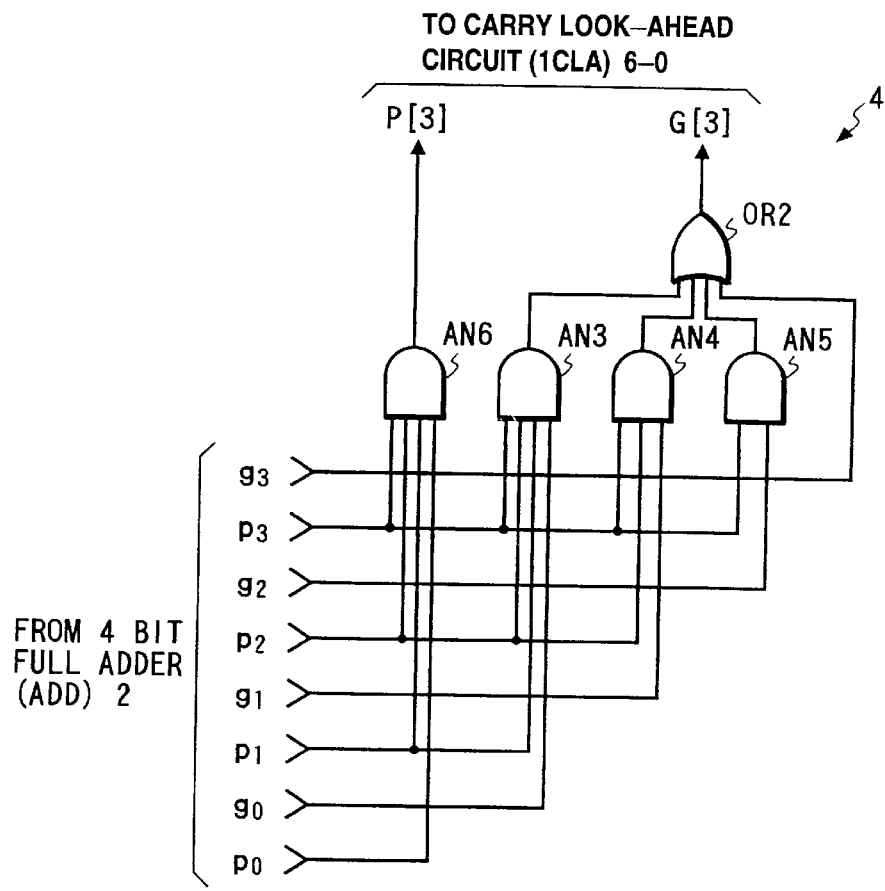
FIG. 3 is a block diagram illustrating an internal structure of the 4-bit carry generation/propagation signal generator (4GP) in FIG. 1 .

FIG. 3 is a block diagram illustrating an internal structure of the 4-bit carry generation/propagation signal generator (4GP) 4 in FIG. 1. The 4-bit carry generation/propagation signal generator (4GP) 4 is provided in correspondence with the 4-bit full adder of the first-stage (ADD) 2. The 4-bit carry generation/propagation signal generator 4 is similar to the carry generation/propagation signal generator (4GP) 32 in the conventional CLA adder shown in FIG. 10, and is constructed as shown in, for example, FIG. 3.

As shown in FIG. 3, the carry generation/propagation signal generator (4GP) 4 comprises an AND gate AN3 for executing a logical product from the third bit p3 to the first bit p1 of the carry propagation signal p3 generated by the 4-bit full adder (ADD) 2 and the zero-th bit g0 of the carry generation signal g3:0 generated by the same, an AND gate AN4 for executing a logical product of the third bit p3 and the second bit p2 of the carry propagation signal p3:0 and the first bit g1 of the carry generation signal g3:0, an AND gate AN5 for executing a logical product of the third bit p3 of the carry propagation signal p3:0 and the second bit g2 of the carry generation signal g3:0, an OR gate OR2 for outputting a logical product of each output of the AND gates AN4, AN5, AN6 and the third bit g3 of the carry generation signal g3:0 as a 1-bit carry generation signal G[3], and an AND gate AN6 for outputting a logical product from the third bit p3 to the zero-th bit p0 of the carry propagation signal p3:0 as a 1-bit carry propagation signal P[3].

The components of the 4-bit carry generation/propagation signal generation circuit (4GP) 4 are connected in the following manner. An input line for the carry propagation signal g0 is connected to a fourth input terminal of the AND gate AN6. An input line for a carry generation signal g0 is connected to a fourth input terminal of the AND gate AN3. An input line for the carry propagation signal p1 is divided into two paths: one is connected to a third input terminal of the AND gate AN6 and the other is connected to a third input terminal of the AND gate AN3. An input line for the carry generation signal g1 is connected to a third input terminal of the AND gate AN4. An input line for the carry propagation signal p2 is divided into three paths: the first is connected to a second input terminal of the AND gate AN6, the second is connected to a second input terminal of the AND gate AN3, and the third is connected to a second input terminal of the AND gate AN4. An input line for the carry generation signal g2 is connected to a second input terminal of the AND gate AN5. An input line for the carry propagation signal p3 is divided into four paths: the first is connected to a first input terminal of the AND gate AN6, the second is connected to a first input terminal of the AND gate AN3, the third is connected to a first input terminal of the AND gate AN4, and the fourth is connected to a first input terminal of the AND gate AN5. An input line for the carry generation signal g3 is connected to a fourth input terminal of the OR gate OR2. An output line for the AND gate is outputted to the carry look-ahead adder (1CLA) 6-0 as a 1-bit carry propagation signal P[3]. An output line for the AND gate AN3 is connected to a first input terminal of the OR gate OR2. An output line for the AND gate AN4 is connected to a second input terminal of the OR gate OR2. An output line for the AND gate AN5 is connected to a third input terminal of the OR gate OR2. An output line for the OR gate OR2 is outputted to the carry look-ahead circuit (1CLA) 6-0 as a 1-bit carry generation signal G[3].

In such a carry generation/propagation signal generator (4GP) 4, the operations of the equation (5) are executed by the AND gates AN3,AN4,AN5 and the OR gate OR2. The operations of the equation (6) are executed by the AND gate AN6.

Figure 4:
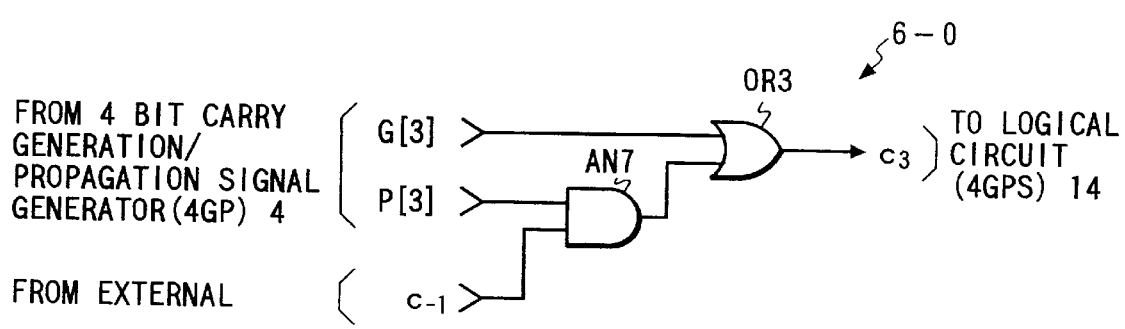
FIG. 4 is a circuit diagram illustrating an internal structure of the carry look-ahead circuit of the first-stage (1CLA) in FIG. 1.
Figure 10:
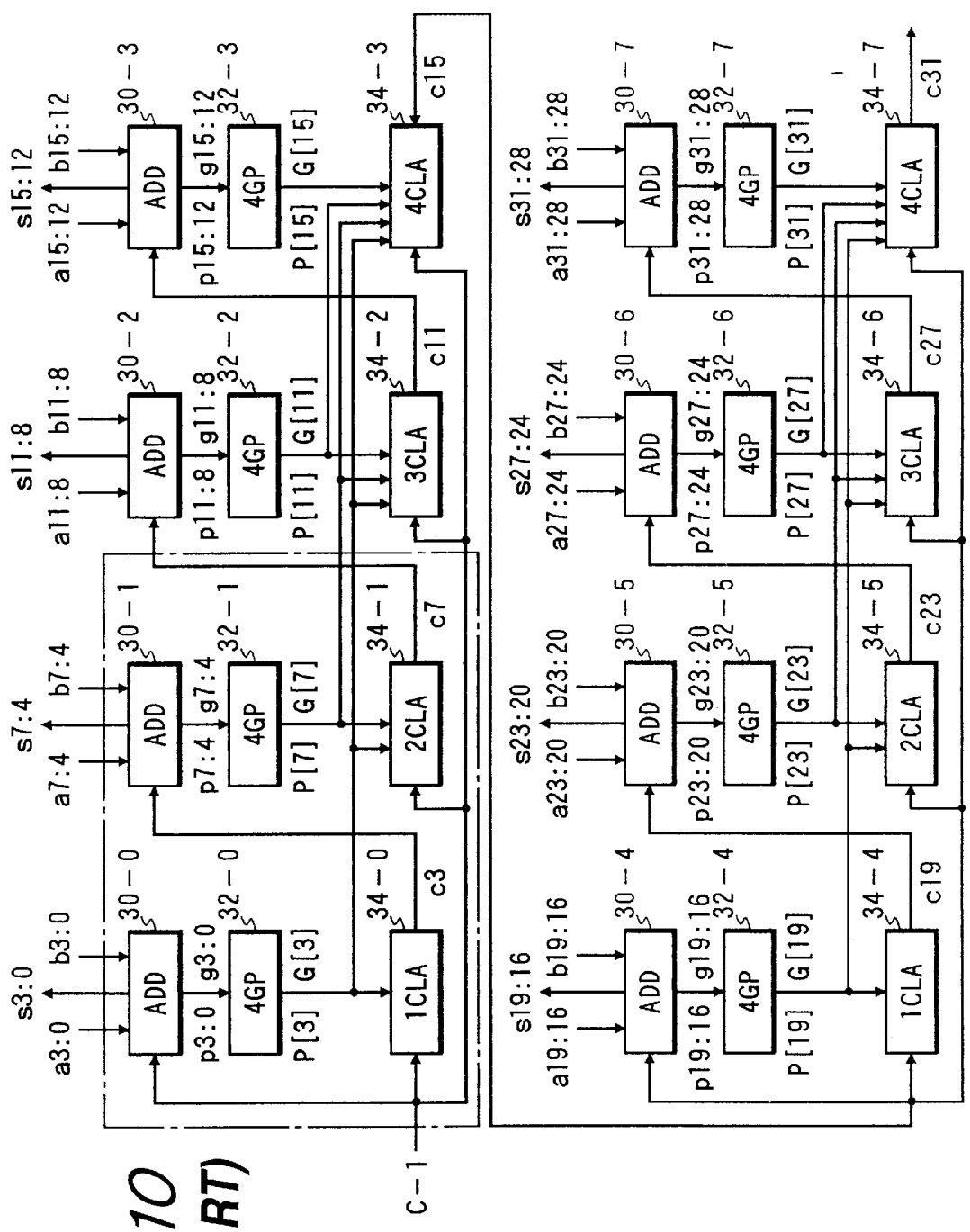
FIG. 10 is a block diagram of the conventional carry look-ahead adder.

Then, the carry look-ahead circuit (1CLA) 6-0 provided in correspondence with the 4-bit full adder (ADD) 2 and the carry generation/propagation signal generator of the first-stage (4GP) 4 is similar to the carry look-ahead circuit (1CLA) 34-0 in the conventional CLA adder shown in FIG. 10, and is constructed so as to execute the operation of the equation (8) as shown in FIG. 4.

FIG. 4 is a circuit diagram illustrating an internal structure of the carry look-ahead circuit of the first-stage (1CLA) 6-0.

As shown in FIG. 4, the carry look-ahead circuit (1CLA) 6-0 comprises an AND gate AN7 for outputting a logical product of the carry propagation signal P [3] generated by the carry generation/propagation signal generator (4GP) 4 and the carry signal c-1 inputted to the 4-bit full adder 2, and an OR gate OR3 for outputting a logical sum of the carry generation signal G (3) generated by the carry generation/propagation signal generator (4GP) 4 and an output of the AND gate AN7 as a carry signal c3 from the third bit of the input signals a7:0,b7:0.

The components of the carry look-ahead circuit (1CLA) 6-0 are connected in the following manner. An input line for the 1-bit carry generation signal G[3] is connected to a first input terminal of the OR gate OR3. An input line for the 1-bit carry propagation signal P[3] is connected to a first input terminal of the AND gate AN7. An externally-inputted carry input line c-1 is applied to a second input terminal of the AND gate AN7. The output line for the AND gate AN7 is connected to a second input terminal of the OR gate OR3. An output line for the OR gate OR3 is outputted to the logical circuit (4GPS) 14 as a c3.

Figure 5:
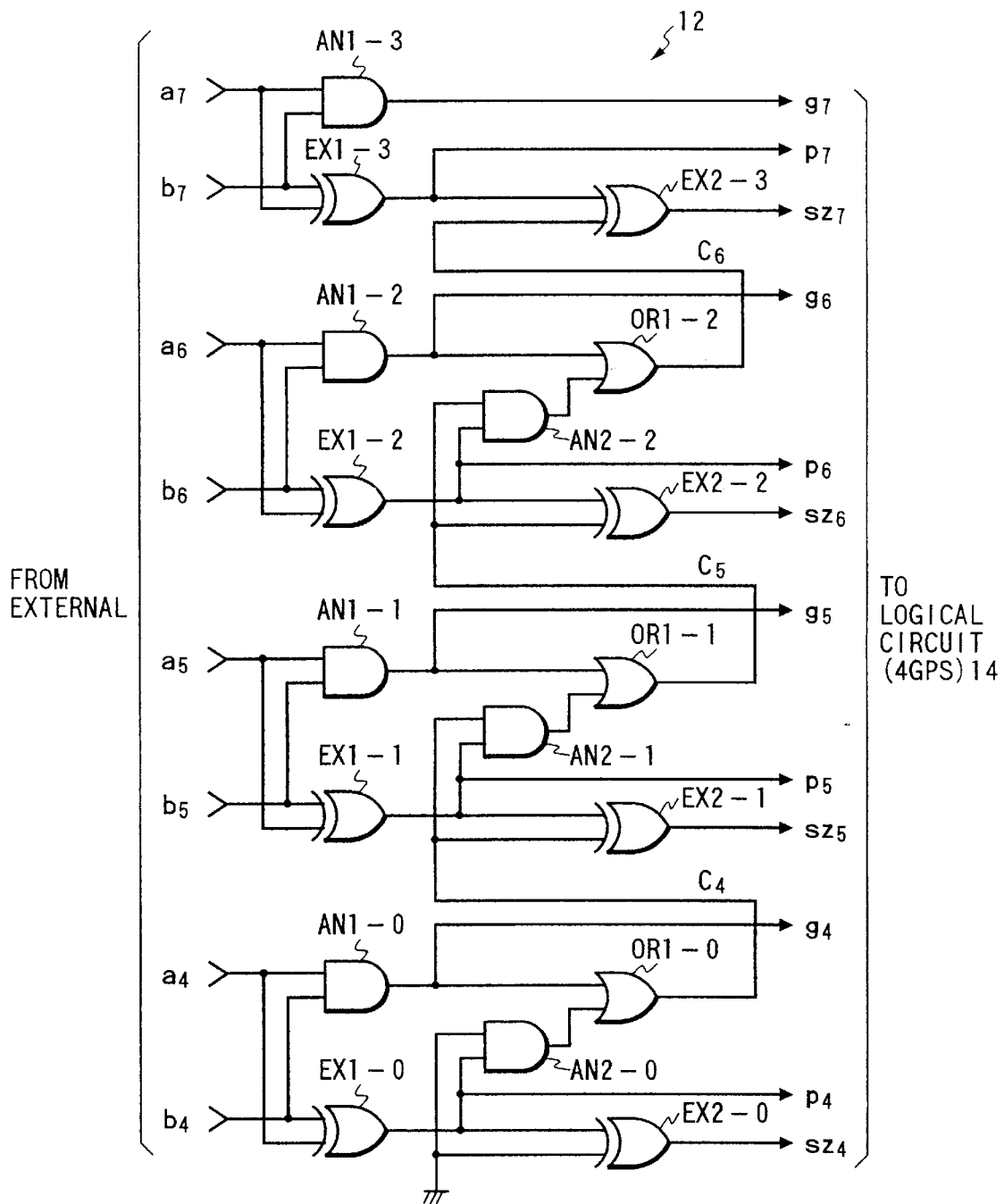
FIG. 5 is a circuit diagram illustrating an internal structure of the 4-bit full adder (ADDZ) of the second-stage in FIG. 1.

FIG. 5 is a circuit diagram illustrating an internal structure of the 4-bit full adder (ADDZ) 12 of the second-stage in FIG. 1.

On the other hand, the 4-bit full adder (ADDZ) 12 of the second-stage to which 4 upper bits a7:4,b7:4 of the input signals a7:0,b7:0 are fed has, as shown in FIG. 5, similar structure to the 4-bit full adder (ADD) 2 shown in FIG. 2.

The 1-bit full adders are connected and designed in the following manner. An input line for the lower bit a4 of the input signal is connected to a first input terminal of the AND gate AN1-0 and a second input terminal of the EXCLUSIVE-OR gate EX1-0. An input line for the lower bit b4 of the input signal is connected to a second input terminal of the AND gate AN1-0 and a first input terminal of the EXCLUSIVE-OR gate EX1-0 of the first-stage. An output line for the AND gate AN1-0 is divided into two paths: one is outputted to the 4-bit carry generation/propagation signal generator (4GP) 4 as a g4 and the other is connected to a first input terminal of the OR gate OR1-0. An output line for the EXCLUSIVE-OR gate EX1-0 is divided into three paths: the first is connected to a second input terminal of the AND gate AN2-0, the second is outputted to the carry generation/propagation signal generator (4GP) 4 as a p4, and the third is connected to a first input terminal of the EXCLUSIVE-OR gate EX2-0. An output line for the EXCLUSIVE-OR gate EX2-0 is outputted to the exterior as a sz4. An output line for the AND gate AN2-0 is connected to a second input terminal of the OR gate OR1-0. An output line for the OR gate OR1-0 is divided into two paths: one is connected to a first input terminal of the AND gate AN2-1 of the 1-bit full adder and the other is connected to a second input terminal of the EXCLUSIVE-OR gate EX2-1 of the second-stage.

An input line for the lower bit a5 of the 1-bit full adder is connected to a first input terminal of the AND gate AN1-1 and a second input terminal of the EXCLUSIVE-OR gate EX1-1. An input line for the lower bit b5 of the second-stage is connected to a second input terminal of the AND gate AN1-1 and first input terminal of the EXCLUSIVE-OR gate EX1-1. An output line for the AND gate AN1-1 is divided into two paths: one is outputted to the 4-bit carry generation/propagation signal generator (4GP) 4 as a g5 and the other is connected to a first input terminal of the OR gate OR1-1. An output line for the EXCLUSIVE-OR gate EX1-1 is divided into three paths: the first is connected to a first input terminal of the EXCLUSIVE-OR gate EX2-1, the second is outputted to the carry generation/propagation signal generator (4GP) 4 as a p5, and the third is connected to a second input terminal of the AND gate AN2-1. An output line for the EXCLUSIVE-OR gate EX2-1 is outputted to the exterior as an sz5. An output line for the AND gate AN2-1 is connected to a second input terminal of the OR gate OR1-1. An output line for the OR gate OR1-1 is divided into two paths: one is connected to a first input terminal of the AND gate AN2-2 of the 1-bit full adder and the other is connected to a second input terminal of the EXCLUSIVE-OR gate EX2-2 of the third-stage.

An input line for the lower bit a6 of the 1-bit full adder is connected to a first input terminal of the AND gate AN1-2 and a second input terminal of the EXCLUSIVE-OR gate EX1-2. An input line for the lower bit b6 of the second-stage is connected to a second input terminal of the AND gate AN1-2 and a first input terminal of the EXCLUSIVE-OR gate EX1-2. An output line for the AND gate AN1-2 is divided into two paths: one is outputted to the 4-bit carry generation/propagation signal generator (4GP) 4 as a g6 and the other is connected to a first input terminal of the OR gate OR1-2. An output line for the EXCLUSIVE-OR gate EX1-2 is divided into three paths: the first is connected to a second input terminal of the AND gate AN2-2, the second is outputted to the carry generation/propagation signal generator (4GP) 4 as a p6, and the third is connected to a first input terminal of the EXCLUSIVE-OR gate EX2-2. An output line for the EXCLUSIVE-OR gate EX2-2 is outputted to the exterior as an sz6. An output line for the AND gate AN2-2 is connected to a second input terminal of the OR gate OR1-2. An output line for the OR gate OR1-2 is connected to a second input terminal of the EXCLUSIVE-OR gate EX2-3 of the 1-bit full adder of the fourth-stage.

An input line for the lower bit a7 of the 1-bit full adder is connected to a first input terminal of the AND gate AN1-3 and a second input terminal of the EXCLUSIVE-OR gate EX1-3. An input line for the lower bit b7 of the fourth-stage is connected to a second input terminal of the AND gate AN1-3 and a first input terminal of the EXCLUSIVE-OR gate EX1-3. An output line for the AND gate AN1-3 is outputted to the 4-bit carry generation/propagation signal generator (4GP) 4 as a g7. An output line for the EXCLUSIVE-OR gate EX1-2 is divided into two paths: one is outputted to the 4-bit carry generation/propagation signal generator (4GP) as a p7 and the other is connected to a first input terminal of the EXCLUSIVE-OR gate EX2-3. An output line for the EXCLUSIVE-OR gate EX2-3 is outputted to the exterior as an sz7.

Here, AND gate AN2-3 of fourth-stage and OR gate OR1-3 are omitted because outputting of a carry signal to the next-stage is unnecessary.

In the 4-bit full adder (ADDZ) 12, carry signal input lines from the lower digit, that is, input lines for the EXCLUSIVE-OR gate EX2-0 and the AND gate AN2-0 which construct the 1-bit full adder of the first-stage are fixed to the low-level (the ground potential) in advance.

Accordingly, in the 4-bit full adder (ADDZ) 12, a carry generation signal g7:4 corresponding to each bit of the input signals a7:4,b7:4 is outputted from each of the AND gates AN1-0 to AN1-3, and a carry propagation signal p7:4 corresponding to each bit of the input signals a7:4,b7:4 is outputted from each of the EXCLUSIVE-OR gates EX1-0 to EX1-3. Further, a temporary summing signal sz7:4 which is a result of the full addition of the input signals a7:4,b7:4 is outputted from each of the EXCLUSIVE-OR gates EX2-0 to EX2-3 on assumption that a carry to the lowest digit of the input signals a7:4,b7:4 is not present (i.e. a carry signal c3 is 0).

Figure 6:
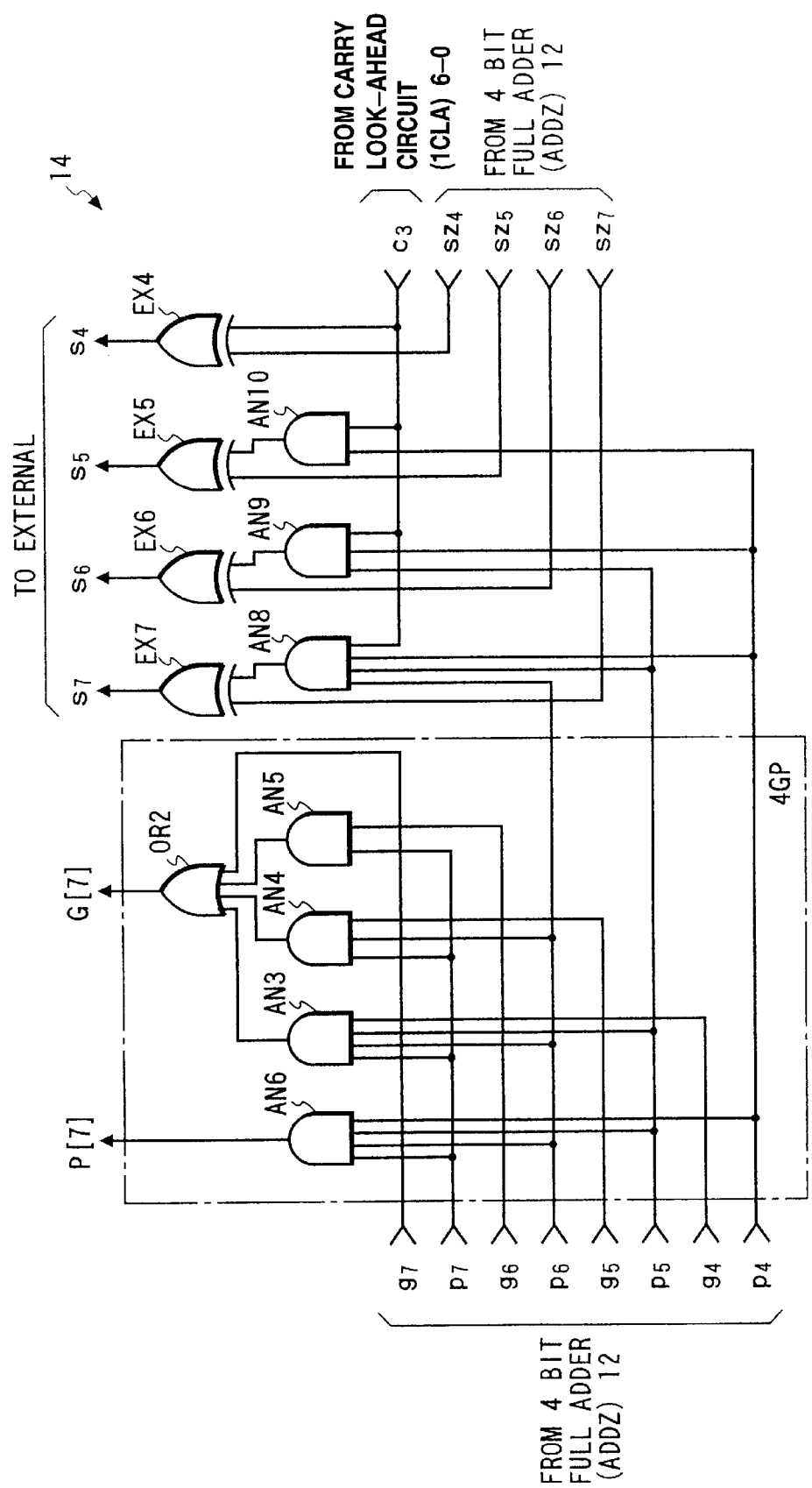
FIG. 6 is a circuit diagram illustrating an internal structure of the logical circuit (4GPS) in FIG. 1.

FIG. 6 is a circuit diagram illustrating an internal structure of the logical circuit (4GPS) 14 in FIG. 1.

The logical circuit (4GPS) 14 provided in correspondence with the 4-bit full adder (ADDZ) 12 of the second-stage is constructed as shown in FIG. 6.

As shown in FIG. 6, the logical circuit (4GPS) 14 includes a circuit composed of AND gates AN3 to AN6 and an OR gate OR2 which is similar to the carry generation/propagation signal generator (4GP) 2 shown in FIG. 3. In addition, the logical circuit 14 further comprises an AND gate AN8 for executing a logical product from the second bit p6 to the zero-th bit of the carry propagation signal p7:4 generated by the 4-bit full adder of the second-stage (ADDZ) 12 and the carry signal c3 generated by the carry look-ahead circuit (1CLA) 6-0, an EXCLUSIVE-OR gate EX7 for outputting an EXCLUSIVE-OR of the output of the AND gate 8 and the third bit sz7 of the temporary summing signal sz7:4 generated by the 4-bit full adder (ADDZ) 12 as a true summing signal s7, an AND gate AN9 for executing a logical product of the first bit p5 and the zero-th bit p4 of the carry propagation signal p7:4 and the carry signal c3, an EXCLUSIVE-OR gate EX6 for outputting an EXCLUSIVE-OR of the output of the AND gate AN9 and the second bit sz6 of the temporary summing signal sz7:4 as a true summing signal s6, an AND gate AN10 for executing a logical product of the zero-th bit p4 of the carry propagation signal p7:4 and the carry signal c3, an EXCLUSIVE-OR gate EX5 for outputting an EXCLUSIVE-OR of the output of the AND gate AN10 and the first bit sz5 of the temporary summing signal sz7:4 as a true summing signal s5, and an EXCLUSIVE-OR gate EX4 for outputting an EXCLUSIVE-OR of the carry signal c3 and the zero-th bit s4 of the temporary summing signal sz7:4.

In such a logical circuit (4GPS) 14, in contrast with the carry generation/propagation signal generator (4GP) 4 shown in FIG. 3, the carry generation signal g7:4 and the carry propagation signal p7:4 generated by the 4-bit full adder of the second-stage (ADDZ) 12 are inputted to the circuits consisting of the AND gates AN3 to AN6 and the OR gate OR2 in place of a carry generation signal g3:0 and a carry propagation signal p3:0.

The components of the 4-bit carry generation/propagation signal generation circuit (4GP) 4 are connected in the following manner. An input line for carry propagation signal p4 is connected to a fourth input terminal of the AND gate AN6. An input line for carry generation signal g4 is connected to a fourth input terminal of AND gate AN3. An input line for carry propagation signal p5 is divided into two paths: one is connected to a third input terminal of AND gate AN6, the other is connected to a third input terminal of AND gate AN3. An input line for carry generation signal g5 is connected to a third input terminal of AND gate AN4. An input line for carry propagation signal p6 is divided into three paths: the first is connected to a second input terminal of AND gate AN6, the second is connected to a second input terminal of AND gate AN3, the third is connected to a second input terminal of AND gate AN4. An input line for carry generation signal g6 is connected to a second input terminal of AND gate AN5. An input line for carry propagation signal p7 is divided into four paths: the first is connected to a first input terminal of AND gate AN6, the second is connected to a first input terminal of AND gate AN3, the third is connected to a first input terminal of AND gate AN4, the fourth is connected to a first input terminal of AND gate AN5. An input line for carry generation signal g7 is connected to a fourth input terminal of OR gate OR2. An output line for the AND gate AN6 is outputted to the carry look-ahead adder (2CLA) 6-1 as a 1-bit carry propagation signal P[7]. An output line for the AND gate AN3 is connected to a first input terminal of OR gate OR2. An output line for the AND gate AN4 is connected to a second input terminal of OR gate OR2. An output line for AND gate AN5 is connected to a third input terminal of OR gate OR2. An output line for the OR gate OR2 is connected to the carry look-ahead adder (2CLA) 6-1 as a 1-bit carry generation signal G[7].

New circuits added to the 4-bit carry generation/propagation signal generation circuit (4GP) 4 are connected and designed as follows. An input line for the carry propagation signal p5 from the 4-bit full adder (ADDZ) 12 is divided into two paths: one is connected to a second input terminal of the AND gate AN8 and the other is connected to a first input terminal of the AND gate AN9. An input line for the carry propagation signal p6 from the same is connected to a first input terminal of the AND gate AN8. An input line for the temporary summing signal sz6 from the same is connected to a first input terminal of the EXCLUSIVE-OR gate EX6. An input line for the temporary summing signal sz7 from the same is connected to a first input terminal of the EXCLUSIVE-OR gate EX7. An input line for the carry signal c3 is divided into four paths: the first is connected to a fourth input terminal of the AND gate AN8, the second is connected to a third input terminal of the AND gate AN9, the third is connected to a second input terminal of the AND gate AN10, and the fourth is connected to a second input terminal of the EXCLUSIVE-OR gate EX4. An input line for the temporary summing signal sz4 from the 4-bit full adder (ADDZ) 12 is connected to a first input terminal of the EXCLUSIVE-OR gate EX4. An input line for temporary summing signal sz5 from the same is connected to a first input terminal of the EXCLUSIVE-OR gate EX5. An output line for the EXCLUSIVE-OR gate EX4 is outputted to the exterior as an s4. An output line for the EXCLUSIVE-OR gate EX5 is connected to the exterior as an s5. An output line for the EXCLUSIVE-OR gate EX6 is outputted to the exterior as an s6. An output line for the EXCLUSIVE-OR gate EX7 is outputted to the exterior as an s7.

In the logical circuit (4GP) 14, the operations of the equation (5) are executed by the AND gates AN3,AN4,AN5 and the OR gate OR2, and thereby a 1-bit carry generation signal G[7] is outputted from the OR gate OR2. In addition, the operations of the equation (6) are executed by the AND gate AN6, and thereby a 1-bit carry propagation signal P[7] is outputted therefrom.

Further, in the logical circuit (4GPS) 14, the operations of equation (16) are executed by the AND gates AN8 to AN10 and the EXCLUSIVE-OR gates EX4 to EX7 for each bit of the temporary summing signal sz7:4, and a true summing signal s7:4 obtained by adding 4 upper bits a7:4,b7:4 of the input signals a,b together with the carry signal c3 is outputted from each of the EXCLUSIVE-OR gate EX4 to EX7.

Figure 7:
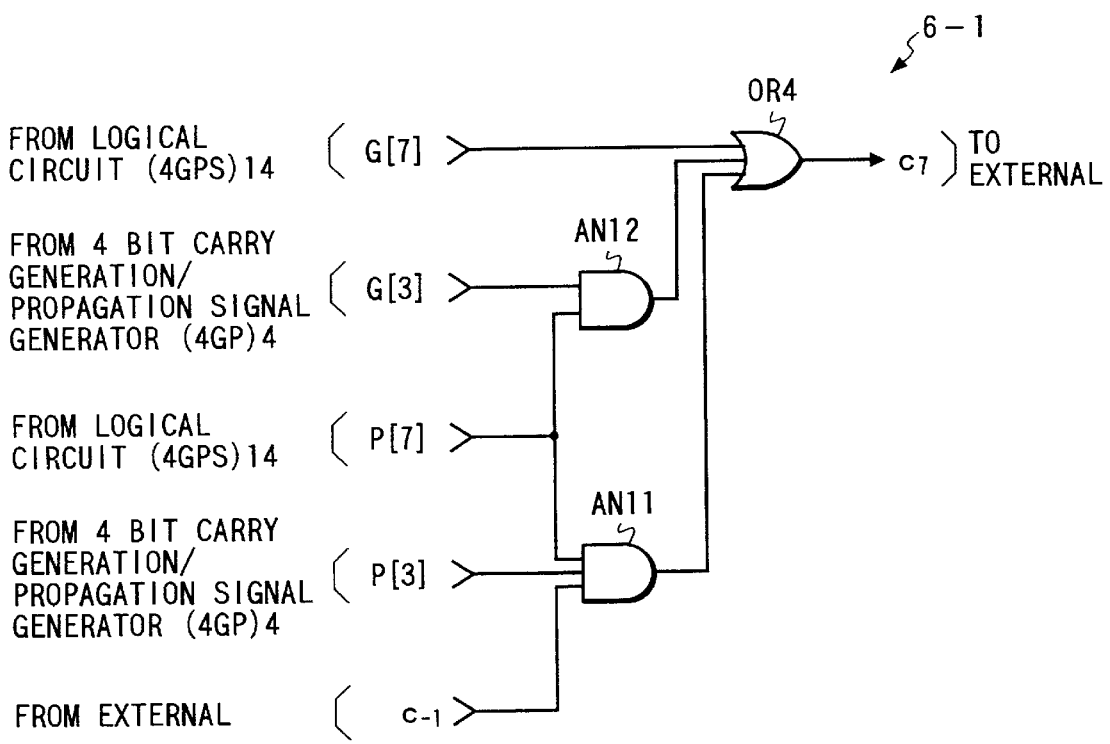
FIG. 7 is a circuit diagram of the carry look-ahead circuit of the second-stage (2CLA) in FIG. 1.

FIG. 7 is a circuit diagram illustrating an internal structure of the carry look-ahead circuit of the second-stage in FIG. 1

The carry look-ahead circuit (2CLA) 6-1 provided in correspondence with the 4-bit full adder (ADDZ) 12 and the logical circuit (4GPS)14 has a similar structure to the carry look-ahead circuit (2CLA) 34-1 in the conventional CLA adder shown in FIG. 10 , and is constructed to execute the operation of the equation (9) as shown in FIG. 7.

As shown in FIG. 7, the carry look-ahead circuit (2CLA) 6-1 comprises an AND gate AN1 1 for outputting the logical product of the carry propagation signal P[7] generated by the logical circuit (4GPS) 14, the carry propagation signal P[3] generated by the carry generation/propagation signal generator of the first-stage (4GP) 4, and the carry signal c-1 assigned to the 4-bit full adder (ADD) 2 of the first-stage, an AND gate AN12 for outputting a logical product of the carry propagation signal P[7] generated by the logical circuit (4GPS)14 and the carry generation signal G[3] generated by the carry generation/propagation signal generator of the first-stage (4GP) 4, and an OR gate OR4 for outputting a logical sum of the carry generation signal G[7] generated by the logical circuit (4GPS) 14 and the outputs of the AND gates AN11 ,AN12 as a carry signal c7 from the seventh bit of the input signals a7:0,b7:0.

That is to say, in the 8-bit CLA adder of the first embodiment, in contrast with the conventional 8 bit CLA adder enclosed by the dash-dot-line shown in FIG. 10, the 4-bit full adder (ADDZ) 12 shown in FIG. 5 and the logical circuit (4GPS) 14 shown in FIG. 6 are used in place of the 4-bit full adder and the carry generation/propagation signal generator (4GP) 32-1 of the second-stage. In other words, a new design is added to the conventional 8-bit CLA adder as follows. A voltage level of the input line of the carry signal c3 to the 4-bit full adder of the second-stage (ADD) 30-1 is fixed to the low level. In addition, there are circuits consisting of the AND gates AN8 to AN10 and the EXCLUSIVE-OR gates EX4 to EX7 shown in FIG. 6 which are added to the carry generation/propagation signal generator of the second-stage (4GP) 32-1.

The components of the carry look-ahead circuit (2CLA) 6-1 are connected in the following manner. An input line for the carry signal c-1 is connected to a third input terminal of the AND gate AN11. An input line for the 1-bit carry propagation signal P[3] from the carry generation/propagation signal generator (4GP) 4 is connected to a second input terminal of the AND gate AN11. An input line for the 1-bit carry propagation signal P[7] from the carry generation/propagation signal generator (4GPS) 14 is divided into two paths: one is connected to a first input terminal of the AND gate AN11 and the other is connected to a second input terminal of the AND gate AN12. An input line for the 1-bit carry generation signal G[3] from the carry generation/propagation signal generator (4GP) 4 is connected to a first input terminal of the AND gate AN12. An input line for the 1-bit carry generation/propagation signal G[7] from the 4-bit carry generation/propagation signal generator (4GPS) 14 is connected to a first input terminal of the OR gate OR4. An output line for the AND gate 11 is connected to a third input terminal of the OR gate OR4. An output line for the AND gate AN12 is connected to a second input terminal of the OR gate OR4. An output line for the OR gate OR4 is outputted to the exterior as a c7.

In the 8-bit CLA adder of the first embodiment, for the 4-bit full adder of the second-stage (ADDZ) 12, the added circuits consisting of the AND gates AN8 to AN10 and the EXCLUSIVE-OR gates EX4 to EX7 and the 4-bit full adder of the first-stage (ADD) 2 correspond to the first operation circuit. The whole circuits consisting of the carry generation/propagation signal generator of the first-stage (4GP) 4, the carry look-ahead circuit of the first-stage (1CLA) 6-0, portions consisting of the AND gates AN3 to AN6 and the OR gate OR2 in the logical circuit (4GPS) 14, and the carry look-ahead circuit of the second-stage (2CLA) 6-1 correspond to the second operation circuit. The 4-bit full adder of the second-stage (ADDZ) 12 corresponds to the plural-bit full adder according to the present invention. Portions consisting of the AND gates AN8 to AN10 and the EXCLUSIVE-OR gates EX4 to EX7 in the logical circuit (4GPS) 14 correspond to the summing signal generator according to the present invention.

In the 8-bit CLA adder of the first embodiment constructed as such, when the 8-bit input signals a7:0,b7:0 and the carry signal c-1 from the lower digit are fed, the 4-bit full adder of the first-stage (ADD) 2 generates a 4-bit carry generation signal g3:0 and a carry propagation signal p3:0, each of which corresponds to 4 lower bits a3:0,b3:0 of the input signals a7:0.b7:0, and starts the operation of the full addition in consideration of the carry signal c-1 for the 4 lower bits a3:0,b3:0. In parallel with this process, the 4-bit full adder of the second-stage (ADDZ) 12 generates a carry generation signal g7:4 and a carry propagation signal p7:4, each of which corresponds to 4 upper bits a7:4,b7:4 of the input signals a7:0,b7:0 and starts the generation of a temporary summing signal sz7:4 after executing the full addition with setting the carry signal c-3 as 0 for 4 upper bits a7:4,b7:4.

In parallel with the full addition in each of the 4-bit full adders (ADD,ADDZ) 2,12, the carry generation/propagation signal generator of the first-stage (4GP) 4 generates a 1-bit carry generation signal G[3] and a carry propagation signal P[3] on the basis of the carry signal g3:0 and the carry propagation signal p3:0 generated by the 4-bit full adder (ADD) 2, and the portions consisting of the AND gates AN3 to AN6 and the OR gate OR2 in the logical circuit of the second-stage (4GPS) 14 generate a 1-bit carry generation signal G[7] and a carry propagation signal P[7] on the basis of the carry generation signal g7:4 and the carry propagation signal p7:4 generated by the 4-bit full adder (ADDZ) 12.

The carry look-ahead circuit of the first-stage (1CLA) 6-0 generates a carry signal c3 on the basis of the 1-bit carry generation signal G[3] and the carry propagation signal P[3] generated by the carry generation/propagation signal generator of the first-stage (4GP) 4 and the externally-inputted carry signal c-1. The carry look-ahead circuit of the second-stage (2CLA) 6-1 generates a carry signal c7 on the basis of the 1-bit carry generation signal G[3] and the carry propagation signal P[3] generated by the carry generation/propagation signal generator of the first-stage (4GP) 4, the 1-bit carry generation signal G[7] and the carry propagation signal P[7] generated by the logical circuit of the second-stage (4GPS) 14, and the externally-inputted carry signal c-1.

After that, the portions consisting of the AND gates AN8 to AN10 and the EXCLUSIVE-OR gates EX4 to EX7 in the logical circuit (4GPS) 14 execute the operations of the equation (16) from the temporary summing signal sz7:4 generated by the 4-bit full adder of the second-stage (ADDZ) 12 and the carry signal c3 generated by the carry look-ahead circuit of the first-stage (1CLA) 6-0 for each bit of the temporary summing signal sz7:4, and thereby output a true summing signal s7:4 of upper bits a7:4,b7;4. Since the full addition of 4 lower bits a3:0,b3:0 has already been completed in the 4-bit full adder of the first-stage (ADD) 2 at the time point at which the true summing signal s7:4 is outputted from the logical circuit (4GPS) 14, at this time point the additive operations for the 8-bit input signals a7:0,b7:0 are completed.

As mentioned above, in the 8-bit CLA adder of the first embodiment, the 4-bit full adder of the second-stage (ADDZ) 12 to which 4 upper bits a7:4,b7:4 of the input signals a,b are fed generates a temporary summing signal sz7:4 resulting from the addition of upper bits a7:4,b7:4 with setting the carry signal c3 from the lower digit as 0. In addition, the portions consisting of the AND gates AN8 to AN10 and the EXCLUSIVE-OR gates EX4 to EX7 in the logical circuit (4GPS) 14 generate a true summing signal s7:4 by executing the operation of the foregoing equation (16) for each bit of the temporary summing signal sz7:4.

Consequently, according to the 8 bit CLA adder of the first embodiment, it is possible to previously generate a temporary summing signal sz7:4 by the 4-bit full adder of the second-stage (ADDZ) 12 while a carry signal c3 from the carry look-ahead circuit of the first-stage (1CLA) 6-0 is not yet determined. After the carry signal c3 is determined, a true summing signal s7:4 can be generated by only the execution of the operation of the foregoing equation (16) by the circuits consisting of the AND gates AN8 to AN10 and the EXCLUSIVE-OR gates EX4 to EX7.

In consequence, a generation time of a 8-bit summing signal s7:0 can be shortened as compared with the structure in which a 4-bit full adder (ADD) 30-1 starts the full addition after a carry signal c3 from the lower digit is determined as the conventional 8-bit CLA adder shown in FIG. 10.

2. Second Embodiment

Next, a second embodiment of the present invention which is applied to a 32-bit CLA adder will be described with reference to FIG. 8.

Figure 8:
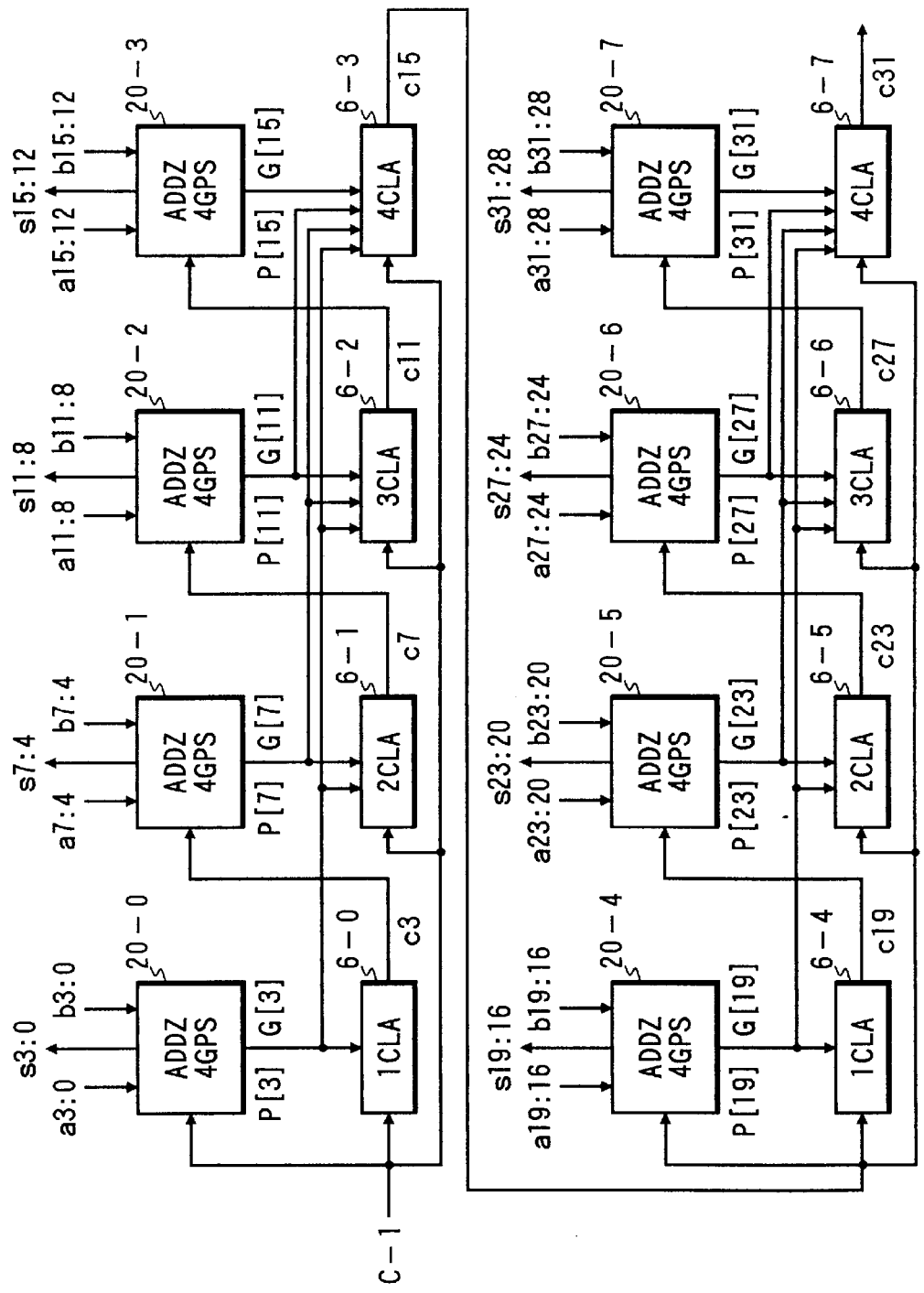
FIG. 8 is a block diagram of the 32-bit carry look-ahead adder of the second embodiment.

FIG. 8 is a block diagram of the 32-bit carry look-ahead circuit of the second embodiment.

As shown in FIG. 8, the 32 bit CLA adder of the second embodiment, in contrast with the conventional 32 bit CLA adder shown in FIG. 10, has the 4-bit full adder (ADDZ) 12 shown in FIG. 5 and circuit blocks (i.e. circuit blocks each having the same structure as the circuit block 20 enclosed by the dash-dot-line shown in FIG. 1) 20-0,20-1, . . . ,20-7 consisting of the logical circuit (4GPS) 14 shown in FIG. 6 in place of each of the 4-bit full adders (ADD) 30-0 to 30-7 and the eight circuit blocks (i.e. the circuit blocks each having the same structure as the circuit block enclosed by the dash-dot-line in FIG. 1) consisting of each carry generation/propagation signal generator (4GP) 32-0 to 32-7 corresponding thereto.

In FIG. 8, the carry look-ahead circuit (1CLA) of the fifth stage 6-4 has the same structure as the carry look-ahead circuit of the first-stage (1CLA) 6-0 shown in FIG. 4 and the carry look-ahead circuit of the sixth-stage (2CLA) 6-5 has the same structure as the carry look-ahead circuit of the second stage (2CLA) 6-1 shown in FIG. 7. The carry look-ahead circuits of the third and seventh-stages (3CLA) 6-2,6-6 and the carry look-ahead circuit of the fourth and eighth-stages (4CLA) 6-3,6-7 are also for executing the general equation (7) mentioned earlier.

The components of the 32-bit CLA circuit of the second embodiment are connected in the following manner. Input lines for the 4-bits a3:0,b3:0 of the input signal a31:0,b31:0 are connected to the 4-bit full adder and the logical circuit (ADDZ.4GPS) 20-0. The output of the 4-bit full adder and logical circuit (ADDZ.4GPS) 20-0 has two busses: one is outputted to the exterior as an s3:0 and the other is connected to the plural carry look-ahead circuits (1CLA,2CLA,3CLA, 4CLA) 6-0,6-1,6-2,6-3 as a 1-bit carry generation signal G[3] and a carry propagation signal P[3]. An input line for the carry signal c-1 is also connected to the carry look-ahead circuit (1CLA) 6-0. An input line for the externally inputted carry signal c-1 is connected to the carry look-ahead circuit (1CLA) 6-0 and the 4-bit full adder and the logical circuit (ADDZ.4GPS) 20-0. An output line for the carry signal c3 from the carry look-ahead adder (1CLA) 6-0 is connected to the 4-bit full adder and logical circuit of the second-stage (ADDZ,4GPS) 20-1.

Input lines for the 4-bits a7:4,b7:4 of the input signals a31:0,b31:0 are connected to the 4-bit full adder and the logical circuit (ADDZ.4GPS) 20-1. The output of the 4-bit full adder and the logical circuit (ADDZ.4GPS) 20-1 has two busses: one is outputted to the exterior as an s7:4 and the other is connected to the plural carry look-ahead adders (2CLA,3CLA,4CLA) 6-1,6-2,6-3 as a 1-bit carry generation signal G[7] and a 1-bit carry propagation signal P[7]. An input line for the externally-inputted carry signal c-1 is connected to the carry look-ahead circuit (2CLA) 6-1. An output line for the carry signal c7 from the carry look-ahead circuit (2CLA) 6-1 is connected to the 4-bit full adder and logical circuit of the third-stage (ADDZ.4GPS) 20-2.

Input lines for 4-bits a11:8,b11:8 of the input signals a31:0,b31:0 are connected to the 4-bit full adder and the logical circuit (ADDZ.4GPS) 20-2. The output of the 4-bit full adder and logical circuit (ADDZ.4GPS) 20-2 has two busses: one is outputted to the exterior as an s11:8 and the other is connected to the plural carry look-ahead adders (3CLA,4CLA) 6-2,6-3 as a 1-bit carry generation signal G[11] and a 1-bit carry propagation P[11].

An input line for the externally-inputted carry signal c-1 is connected to the carry look-ahead circuit (3CLA) 6-2. An output line for the carry signal c11 from the carry look-ahead circuit (3CLA) 6-2 is connected to the 4-bit full adder and logical circuit of the fourth-stage (ADDZ,4GPS) 20-3.

Input lines for the 4-bits a15:12,b15:12 of the input signals a31:0,b31:0 are connected to the 4-bit full adder and the logical circuit (ADDZ.4GPS) 20-3. The output of the 4-bit full adder and logical circuit (ADDZ.4GPS) 20-3 has two busses: one is outputted to the exterior as an s15:12 and the other is connected to the carry look-ahead adders (4CLA) 6-3 as a 1-bit carry generation signal G[15] and a 1-bit carry propagation signal P[15]. An input line for the externally-inputted carry signal c-1 is connected to the carry look-ahead circuit (4CLA) 6-3. An output line for the carry signal c15 from the carry look-ahead circuit (4CLA) 6-3 is connected to the carry look-ahead circuit (1CLA) 6-4.

Similarly, input lines for the 4-bits a19:16,b19:16 of the input signal a31:0,b31:0 are connected to the 4-bit full adder and the logical circuit (ADDZ,4GPS) 20-4. The output of the 4-bit full adder and logical circuit (ADDZ.4GPS) 20-4 has two busses: one is outputted to the exterior as an s19:16 and the other is connected to the plural carry look-ahead adders (1CLA,2CLA,3CLA,4CLA) 6-4,6-5,6-6,6-7 as a 1-bit carry generation signal G[19] and a 1-bit carry propagation signal P[19]. An input line for the carry signal c15 from the carry look-ahead circuit (4CLA) 6-3 is connected to the carry look-ahead circuit (1CLA) 6-4 and the 4-bit full adder and the logical circuit (ADDZ,4GPS) 20-4. An output line for the carry signal c19 from the carry look-ahead circuit (1CLA) 6-4 is connected to the 4-bit full adder and the logical circuit of the fifth-stage (ADDZ,4GPS) 20-5.

Input lines for the 4-bits a23:20,b23:20 of the input signals a31:0,b31:0 are connected to the 4-bit full adder and the logical circuit (ADDZ.4GPS) 20-5. The output of the 4-bit full adder and logical circuit (ADDZ.4GPS) 20-5 has two busses: one is outputted to the exterior as an s23:0 and the other is connected to the plural carry look-ahead adders (2CLA,3CLA,4CLA) 6-5,6-6,6-7 as a 1-bit carry generation signal G[23] and a 1-bit carry propagation signal P[23]. An input line for the carry signal c15 from the carry look-ahead adder (4CLA) 6-3 is connected to the carry look-ahead adder (2CLA) 6-5. An output line for the carry signal c23 from the carry look-ahead circuit (2CLA) 6-5 is connected to the 4-bit full adder and logical circuit of the sixth-stage (ADDZ.4GPS) 20-6.

Input lines for the 4-bits a27:24,b27:24 of the input signals a31:0,b31:0 are connected to the 4-bit full adder and the logical circuit (ADDZ.4GPS) 20-6. The output of the 4-bit full adder and logical circuit (ADDZ.4GPS) 20-6 has two busses: one is outputted to the exterior as an s27:24 and the other is connected to the plural carry look-ahead adders (3CLA,4CLA) 6-6,6-7 as a 1-bit carry generation signal G[27] and a 1-bit carry propagation signal P[27]. An input line for the carry signal c15 from the carry look-ahead adder (4CLA) 6-3 is connected to the carry look-ahead adder (3CLA) 6-6. An output line for the carry signal c27 from the carry look-ahead circuit (3CLA) 6-6 is connected to the 4-bit full adder and logical circuit of the seventh-stage (ADDZ.4GPS) 20-7. An input line for the carry signal c23 from the carry look-ahead circuit (2CLA) 6-5 is connected to the carry look-ahead circuit (3CLA) 6-6.

Input lines for the 4-bits a31:28,b31:28 of the input signals a31:0,b31:0 are connected to the 4-bit full adder and the logical circuit (ADDZ.4GPS) 20-7. The output of the 4-bit full adder and logical circuit (ADDZ.4GPS) 20-7 has two busses: one is outputted to the exterior as an s31:28 and the other is connected to the carry look-ahead adders (4CLA) 6-7 as a 1-bit carry generation signal G[31] and a 1-bit carry propagation signal P[31]. An input line for the carry signal c15 from the carry look-ahead adder (4CLA) 6-3 is connected to the carry look-ahead circuit (4CLA) 6-7. An output line for the carry signal c31 from the carry look-ahead circuit (4CLA) 6-7 is connected to the exterior.

Also, in the 32-bit CLA adder of the second embodiment constructed in this manner, a summing signal is generated more quickly by the action of the 4-bit full adder (ADDZ) 12 in each of the circuit blocks 20-0 to 20-7 and the circuit consisting of the AND gates AN8 to AN10 and the EXCLUSIVE-OR gates EX4 to EX7 in the logical circuit (4GPS) 14 after carry signals (c1,c3,c7,c11 ,c15,c19,c23, c27) from the lower digit are determined. Therefore, an additive operation time can be shortened.

3. Third Embodiment

Lastly, a 32-bit CLA adder of a third embodiment will be described with reference to FIG. 9.

Figure 9:
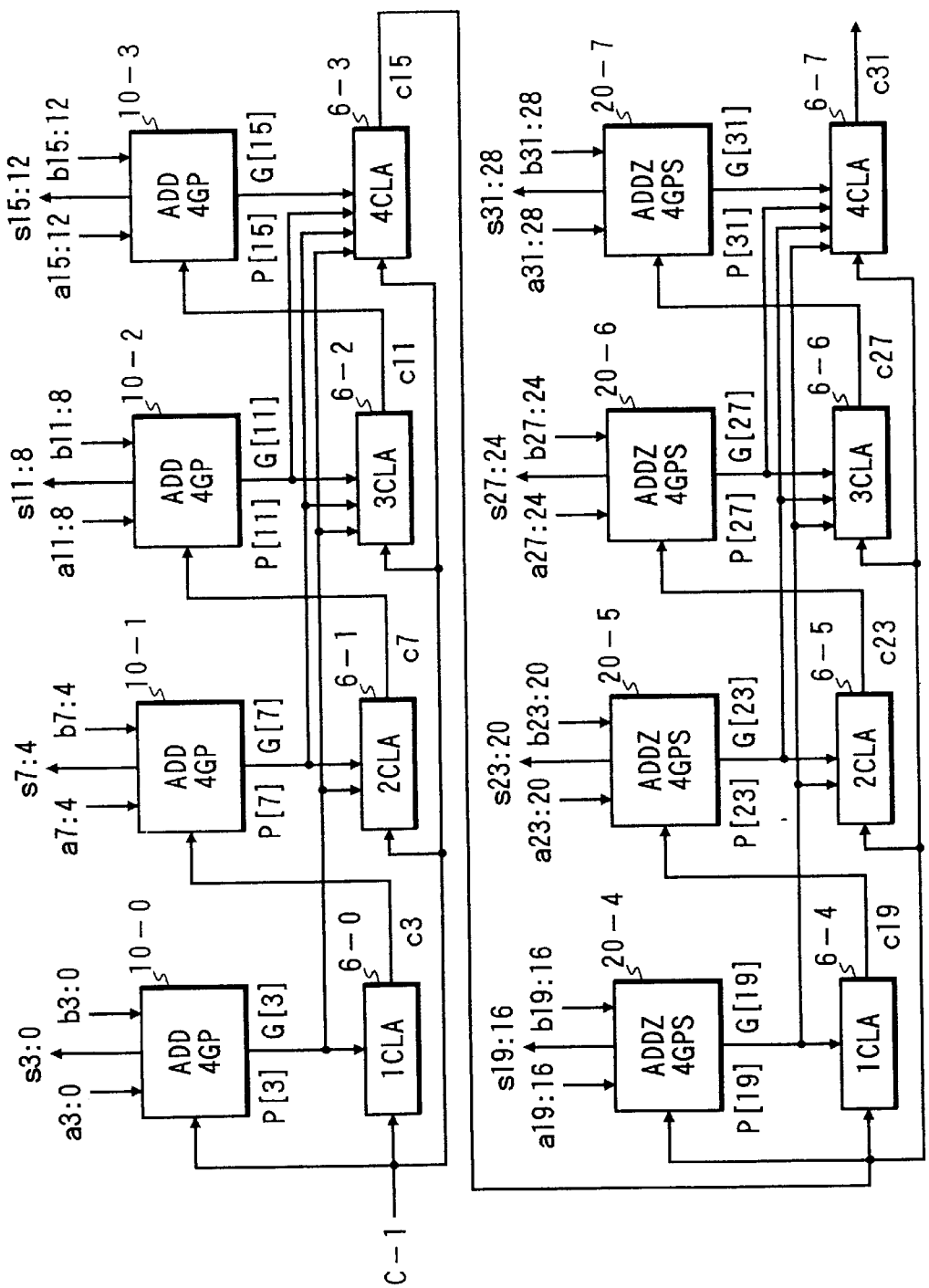
FIG. 9 is a block diagram of the 32-bit carry look-ahead adder of the third embodiment.

FIG. 9 is a block diagram of the 32-bit carry look-ahead adder of the third embodiment. The 32-bit CLA adder of the third embodiment, in contrast with the conventional 32-bit CLA adder shown in FIG. 10, has the 4-bit full adder (ADDZ) 12 shown in FIG. 5 and circuit blocks 20-4 to 20-7 consisting of the logical circuit (4GPS) 14 shown in FIG. 6 in place of four 4-bit full adders (ADD) 30-4 to 30-7 to which 16 upper bits a31:6,b31:6 of the input signals a31:0, b31:0 are fed and four circuit blocks consisting of each of the carry generation/propagation signal generators (4GP) 32-4 to 32-7 corresponding thereto. Here, in FIG. 9, reference characters 10-0,10-1, . . . ,10-3 indicate the circuit blocks having the same structure with the circuit block 10 enclosed by the dot-dash-line in FIG. 1. Therefore, portions corresponding to 16 lower bits a15:0,b15:0 of the input signals a31:0,b31:0 are similar to the conventional ones shown in FIG. 10.

The components of the 32-bit CLA circuit of the third embodiment are connected in the following manner. Input lines for the 4-bits a3:0,b3:0 of the input signal a31:0,b31:0 are connected to the 4-bit full adder and the logical circuit (ADD.4GP)10-0. The output of the 4-bit full adder and the logical circuit (ADDZ.4GPS) 10-0 has two busses: one is outputted to the exterior as an s3:0 and the other is connected to the plural carry look-ahead circuits (1CLA,2CLA,3CLA, 4CLA) 6-0,6-1,6-2,6-3 as a 1-bit carry generation signal G[3] and a 1-bit carry propagation signal P[3].

An input line for the externally-inputted carry signal c-1 is connected to the carry look-ahead circuit (1CLA) 6-0 and the 4-bit full adder and logical circuit (ADD.4GP) 10-0. An output line for the carry signal c3 from the carry look-ahead adder (1CLA) 6-0 is connected to the 4-bit full adder and logical circuit of the first-stage (ADD.4GP) 10-1.

Input lines for the 4-bits a7:4,b7:4 of the input signals a31:0,b31:0 are connected to the 4-bit full adder and the logical circuit (ADD.4GP) 10-1. The output of the 4-bit full adder and logical circuit (ADD.4GP) 10-1 has two busses: one is outputted to the exterior as an s7:4 and the other is connected to the plural carry look-ahead adders (2CLA, 3CLA,4CLA) 6-1,6-2,6-3 as a 1-bit carry generation signal G[7] and a 1-bit carry propagation signal P[7].

An input line for the externally-inputted carry signal c-1 is connected to the carry look-ahead circuit (2CLA) 6-1. An output line for the carry signal c7 from the carry look-ahead circuit (2CLA) 6-1 is connected to the 4-bit full adder and logical circuit of the second-stage (ADD.4GP) 10-2.

Input lines for the 4-bits a11:8,b11:8 of the input signals a31:0,b31:0 are connected to the 4-bit full adder and the logical circuit (ADD.4GP) 10-2. The output of the 4-bit full adder and the logical circuit (ADD.4GP) 10-2 has two busses: one is outputted to the exterior as an s11:8 and the other is connected to the plural carry look-ahead adders (3CLA,4CLA) 6-2,6-3 as a 1-bit carry generation signal G[11] and a 1-bit carry propagation P[11].

An input line for the externally-inputted carry signal c-1 is connected to the carry look-ahead circuit (3CLA) 6-2. An output line for the carry signal c11 from the carry look-ahead circuit (3CLA) 6-2 is connected to the 4-bit full adder and logical circuit of the third-stage (ADD.4GP) 10-3.

Input lines for the 4-bits a15:12,b15:12 of the input signals a31:0,b31:0 are connected to the 4-bit full adder and the logical circuit (ADD.4GP) 10-3. The output of the 4-bit full adder and the logical circuit (ADD.4GP) 10-3 has two busses: one is outputted to the exterior as an s15:12 and the other is connected to the carry look-ahead adders (4CLA) 6-3 as a 1-bit carry generation signal G[15] and a 1-bit carry propagation signal P[15]. An input line for the externally-inputted carry signal c-1 is connected to the carry look-ahead adder (4CLA) 6-3. An output line for the carry signal c15 from the carry look-ahead circuit (4CLA) 6-3 is connected to the 4-bit full adder and logical circuit of the carry look-ahead circuit (1CLA) 6-4.

Similarly, input lines for the 4-bits a19:16,b19:16 of the both input signals a31:0,b31:0 are connected to the 4-bit full adder and the logical circuit (ADDZ,4GPS) 20-4. The output of the 4-bit full adder and the logical circuit (ADDZ.4GPS) 20-4 has two busses: one is outputted to the exterior as an s19:16 and the other is connected to the plural carry look-ahead adders (1CLA,2CLA,3CLA,4CLA) 6-4,6-5,6-6,6-7 as a 1-bit carry generation signal G [19] and a 1-bit carry propagation signals P[19]. An input line for the carry signal c15 from the carry look-ahead circuit (4CLA) 6-3 is connected to the carry look-ahead circuit (1CLA) 6-4 and the 4-bit full adder and the logical circuit (ADDZ.4GPS) 20-4. An output line for the carry signal c19 from the carry look-ahead circuit (1CLA) 6-4 is connected to the 4-bit full adder and the logical circuit of the fifth-stage (ADDZ,4GPS) 20-5.

Input lines for the 4-bits a23:20,b23:20 of the input signals a31:0,b31:0 are connected to the 4-bit full adder and the logical circuit (ADDZ.4GPS) 20-5. The output of the 4-bit full adder and the logical circuit (ADDZ.4GPS) 20-5 has two busses: one is outputted to the exterior as an s23:0 and the other is connected to the plural carry look-ahead adders (2CLA,3CLA,4CLA) 6-5,6-6,6-7 as a 1-bit carry generation signal G[23] and a 1-bit carry propagation signal P[23]. An input line for the carry signal c15 from the carry look-ahead adder (4CLA) 6-3 is connected to the carry look-ahead adder (2CLA) 6-5. An output line for the carry signal c23 from the carry look-ahead circuit (2CLA) 6-5 is connected to the 4-bit full adder and logical circuit of the sixth-stage (ADDZ.4GPPS) 20-6.

Input lines for the 4-bits a27:24,b27:24 of the input signals a31:0,b31:0 are connected to the 4-bit full adder and the logical circuit (ADDZ.4GPS) 20-6. The output of the 4-bit full adder and the logical circuit (ADDZ.4GPS) 20-6 has two busses: one is outputted to the exterior as an s27:24 and the other is connected to the plural carry look-ahead adders (3CLA,4CLA) 6-6,6-7 as a 1-bit carry generation signal G[27] and a 1-bit carry propagation signal P[27]. An input line for the carry signal c15 from the carry look-ahead adder (4CLA) 6-3 is connected to the carry look-ahead circuit (3CLA) 6-6. An output line for the carry signal c27 from the carry look-ahead circuit (3CLA) 6-6 is connected to the 4-bit full adder and logical circuit of the seventh-stage (ADDZ.4GPS) 20-7.

Input lines for the 4-bits a31:28,b31:28 of the input signals a31:0,b31:0 are connected to the 4-bit full adder and the logical circuit (ADDZ.4GPS) 20-7. The output of the 4-bit full adder and the logical circuit (ADDZ.4GPS) 20-7 has two busses: one is outputted to the exterior as an s31:28 and the other is connected to the carry look-ahead adders (4CLA) 6-7 as a 1-bit carry generation signal G[31] and a 1-bit carry propagation signal P[31].

An input line for the carry signal c15 from the carry look-ahead adder (4CLA) 6-3 is connected to the carry look-ahead adder (4CLA) 6-7. An output line for the carry signal c31 from the carry look-ahead circuit (4CLA) 6-7 is outputted to the exterior. An input line for the carry signal c15 from the carry look-ahead adder (4CLA) 6-3 is connected to the carry look-ahead adder (2CLA) 6-5. An output line for the carry signal c23 from the carry look-ahead circuit (2CLA) 6-5 is connected to the 4-bit full adder and logical circuit of the sixth-stage (ADDZ.4GPS) 20-6. An input line for the carry signal c15 from the carry look-ahead adder (4CLA) 6-3 isconnected to the carry look-ahead adder (2CLA) 6-5. An output line for the carry signal c23 from the carry look-ahead circuit (2CLA) 6-5 is connected to the 4-bit full adder and logical circuit of the sixth-stage (ADDZ.4GPS) 20-6. An input line for the carry signal c15 from the carry look-ahead adder (4CLA) 6-3 is connected to the carry look-ahead adder (2CLA) 6-5. An output line for the carry signal c23 from the carry look-ahead circuit (2CLA) 6-5 is connected to the 4-bit full adder and logical circuit of the sixth-stage (ADDZ.4GPS) 20-6.

In short, as described above, the circuit block 20 consisting of the 4-bit full adder (ADDZ) 12 and the logical circuit (4GPS) 14 is advantageous in that a summing signal can be generated after a carry signal from the lower digit is determined without executing the full addition. In a CLA adder of this type, the generation (determination) of a carry signal corresponding to an upper digit of the input signals a,b tends to be more delayed.

Therefore, in the 32-bit CLA adder of the third embodiment, all the eight circuit blocks 10 are not replaced by the circuit block 20, in contrast to the above second embodiment. In the 32-bit CLA adder of the third embodiment, four upper circuits blocks 10 corresponding to 16 upper bits a31:16,b31:16 of the input signals a31:0,b31:0 are replaced by the circuit block 20. According to the 32-bit adder of the third embodiment, the additive operation time can be shortened while keeping the increased amount of circuits due to addition of the circuit block 20, that is, the circuits consisting of the AND gates AN8 to AN10 and the EXCLUSIVE-OR gates EX4 to EX7, to a minimum.

In the 32-bit CLA adder of the third embodiment, although the circuit block 20 is used for the portion corresponding to 16 upper bits a31:16,b31:16 of the input signals a31:0,b31:0, the circuit block 20 may be used in the portions where the operation time results in a delay if the full addition is executed after a carry signal from the lower digit is determined. Consequently, the above-mentioned portions can be appropriately selected depending on the structure of the whole adder.

Also, in each of the CLA adders of the first to the third embodiments, an addition is executed by dividing the input signals a,b into the groups each having 4 bit. The number of bits for each group may differ from 4.

What is claimed is:

1. A logical operation circuit comprising:
   a plural-bit full adder for receiving two plural-bit input signals to be added, said plural-bit full adder including
      first AND gates for implementing logical AND operation between corresponding bits of the two plural-bit input signals to generate a plural-bit carry generation signal,
      first EXCLUSIVE-OR gates for implementing logical EXCLUSIVE-OR operation between corresponding bits of the two plural-bit input signals to generate a plural-bit carry propagation signal, and
      means for adding the two plural-bit input signals on an assumption that a carry to a lowest digit of the two plural-bit input signals is not present and for outputting a result of the addition of the two plural-bit input signals as a temporary plural-bit summing signal; and
   a summing signal generator for receiving the temporary plural-bit summing signal, the plural-bit carry propagation signal except a highest bit thereof, and a carry-in signal from a digit one lower than a lowest digit of the two plural-bit input signals, said summing signal generator including second AND gates for implementing logical AND operation between the carry-in signal and the plural-bit carry propagation signal except a highest bit thereof, a second EXCLUSIVE-OR gate for implementing logical EXCLUSIVE-OR operation between the carry-in signal and a lowest bit of the temporary plural-bit summing signal, third EXCLUSIVE-OR gates for implementing logical EXCLUSIVE-OR operation between the temporary plural-bit summing signal except a lowest bit thereof and output signals of said second AND gates, said second and third EXCLUSIVE-OR gates generating and outputting a final plural-bit summing signal.

2. A carry look-ahead adder comprising:

a plurality of first operation circuits (20-0, 20-1, 20-2, 20-3, 20-4, 20-5, 20-6, 20-7) receiving respective groups of bits of two plural-bit input signals (a31:0, b31:0) to be added, the groups corresponding to digits respectively, the first operation circuits (20-0, 20-1, 20-2, 20-3, 20-4, 20-5, 20-6, 20-7) adding the input signals (a31:0, b31:0) together with carry signals (c-1, c3, c7, c11, c15, c19, c23, c27) to generate a final plural-bit summing signal (s31:0), the first operation circuits (20-0, 20-1, 20-2, 20-3, 20-4, 20-5, 20-6, 20-7) operating for generating a plural-bit carry generation signal (g31:0) and a plural-bit carry propagation signal (p31:0) in response to the input signals (a31:0, b31:0) and the carry signals (c-1, c3, c7, c11, c15, c19, c23, c27); and a plurality of second operation circuits (6-0, 6-1, 6-2, 6-3, 6-4, 6-5, 6-6, 6-7) for generating the carry signals (c3, c7, c11, c15, c19, c23, c27) to be inputted to the first operation circuits (20-0, 20-1, 20-2, 20-3, 20-4, 20-5, 20-6, 20-7) except the first operation circuit (20-0) corresponding to the lowest digit in response to carry signals (c-1, c15) among the carry signals (c-1, c3, c7, c11, c15, c19, c23, c27), the plural-bit carry generation signal (g31:0), and the plural-bit carry propagation signal (p31:0), and for outputting the generated carry signals (c3, c7, c11, c15, c19, c23, c27) to the corresponding first operation circuits (20-1, 20-2, 20-3, 20-4, 20-5, 20-6, 20-7);

wherein each of the first operation circuits (20-0, 20-1, 20-2, 20-3, 20-4, 20-5, 20-6, 20-7) comprises a plural-bit full adder (12) and a summing signal generator (14);

the plural-bit full adder (12) operating for receiving two plural-bit input signals to be added, the plural-bit full adder (12) including first AND gates for implementing logical AND operation between corresponding bits of the input signals to generate a plural-bit carry generation signal, the plural-bit full adder (12) including first EXCLUSIVE-OR gates for implementing logical EXCLUSIVE-OR operation between the corresponding bits of the input signals to generate a plural-bit carry propagation signal, the plural-bit full adder (12) including means for adding the input signals on an assumption that a carry to a lowest digit of the input signals is not present and for outputting a result of the addition of the input signals as a temporary plural-bit summing signal; and the summing signal generator (14) operating for receiving the temporary plural-bit summing signal, bits of the plural-bit carry propagation signal except a highest bit thereof, and a carry signal from one lower digit than the lowest digit of the input signals, the summing signal generator (14) including second AND gates for implementing logical AND operation between the carry signal and the bits of the plural-bit carry propagation signal except the highest bit thereof, the summing signal generator (14) including a second EXCLUSIVE-OR gate for implementing logical EXCLUSIVE-OR operation between the carry signal and a lowest bit of the temporary plural-bit summing signal, the summing signal generator (14) including third EXCLUSIVE-OR gates for implementing logical EXCLUSIVE-OR operation between bits of the temporary plural-bit summing signal except the lowest bit thereof and output signals of the second AND gates, the second and third EXCLUSIVE-OR gates generating and outputting a final plural-bit summing signal.

3. A logical operation circuit comprising:

(a) an n-bit full adder for receiving a carry-in signal and first and second n-bit input signals to be added, said n-bit full adder including:

(a1) a plurality of first AND gates, each having first and second input terminals and an output terminal, each of the first input terminals receiving one bit of the first n-bit input signal, each of the second input terminals receiving a corresponding bit of the second n-bit input signal, and each of the output terminals outputting a corresponding bit of an n-bit carry generation signal, (a2) a plurality of first EXCLUSIVE-OR gates, each having first and second input terminals and an output terminal, each of the first input terminals receiving one bit of the first n-bit input signal, each of the second input terminals receiving a corresponding bit of the second n-bit input signal, and each of the output terminals outputting a corresponding bit of an n-bit carry propagation signal, and (a3) means for performing an addition of the n-bit input signals on an assumption that a carry-in signal is not asserted, said means outputting a result of the addition as a temporary n-bit summing signal; and (b) a summing signal generator for receiving the temporary n-bit summing signal, the n-bit carry propagation signal except a highest bit thereof, and the carry-in signal, the summing signal generator including:

(b1) a plurality of second AND gates, each having first and second input terminals and an output terminal, each of the first input terminals receiving the carry-in signal, each of the second terminals receiving one bit of the n-bit carry propagation signal except a highest bit thereof, and each of the output terminals outputting one bit of a (n−1)-bit correction signal, (b2) a second EXCLUSIVE-OR gate having first and second input terminals and an output terminal, the first input terminal receiving the carry-in signal, the second input terminal receiving a lowest bit of the temporary n-bit summing signal, and the output terminal outputting one bit of a final n-bit summing signal, and (b3) a plurality of third EXCLUSIVE-OR gates, each having first and second input terminals and an output terminal, each of the first input terminals receiving one bit of the temporary n-bit summing signal except a lowest bit thereof, each of the second input terminals receiving one bit of the (n−1)-bit correction signal, and each of the output terminals outputting one of (n−1) bits of a final n-bit summing signal.

4. A carry-lookahead adder for adding first and second binary numbers according to an outside carry-in signal including a plurality of adder modules, each of said binary numbers being divided into a plurality of segments and each segment being further subdivided into a plurality of portions, and each of said adder modules being assigned a number from 1 to k, receiving a high-level carry-in signal, a segment of the first binary number, and a corresponding segment of the second binary number, outputting a high-level carry-out signal and the result of adding the segment of the first binary number and the corresponding segment of the second binary number according to the high-level carry-in signal, and comprising:

(a) a plurality of logical operation circuits, each being assigned a number i from 1 to m, receiving a low-level carry-in signal, a portion of the first binary number, and a corresponding portion of the second binary number, outputting the result of adding the portion of the first binary number and the corresponding portion of the second binary number according to the low-level carry-in signal, and including:

(a1) an n-bit full adder for adding the portion of the first binary number and the corresponding portion of the second binary number, said n-bit adder including:

(a1i) a plurality of first AND gates, each having first and second input terminals and an output terminal, each of the first input terminals receiving one bit of the portion of the first binary number, each of the second input terminals receiving a corresponding bit of the corresponding portion of the second binary number, and each of the output terminals outputting a corresponding bit of an n-bit carry generation signal, (a1ii) a plurality of first EXCLUSIVE-OR gates, each having first and second input terminals and an output terminal, each of the first input terminals receiving one bit of the portion of the first binary number, each of the second input terminals receiving a corresponding bit of the corresponding portion of the second binary number, and each of the output terminals outputting a corresponding bit of an n-bit carry propagation signal, and (a1iii) means for performing an addition of said portions on an assumption that a carry to a lowest bit of said portions is not present, said means outputting a result of said addition as a temporary n-bit summing signal; and (a2) a summing signal generator for receiving the temporary n-bit summing signal, the n-bit carry propagation signal except a highest bit thereof, and the low-level carry-in signal, said summing signal generator including:

(a2i) a plurality of second AND gates, each having first and second input terminals and an output terminal, each of the first input terminals receiving the low-level carry-in signal, each of the second terminals receiving one bit of the n-bit carry propagation signal except a highest bit thereof, and each of the output terminals outputting one bit of a (n−1)-bit correction signal, (a2ii) a second EXCLUSIVE-OR gate having first and second input terminals and an output terminal, the first input terminal receiving the low-level carry-in signal, the second input terminal receiving a lowest bit of the temporary n-bit summing signal, and the output terminal outputting one bit of a final summing signal, and (a2iii) a plurality of third EXCLUSIVE-OR gates, each having first and second input terminals and an output terminal, each of the first input terminals receiving one bit of the temporary n-bit summing signal except a lowest bit thereof, each of the second input terminals receiving one bit of the (n−1)-bit correction signal, and each of the output terminals outputting one bit of a final summing signal; and (b) a plurality of carry-lookahead circuits, each carry-lookahead circuit being assigned a number j from 1 to m, receiving the high-level carry-in signal, the highest bits of said first through j-th carry-propagation signals, and the highest bits of said first through j-th carry-generation signals, and outputting a low-level carry-out signal;

wherein the high-level carry-in signal received by each adder module is received by the first logical operation circuit within that adder module as the low-level carry-in signal, the low-level carry-out signals outputted by the first through (m−1)-th carry-lookahead circuits within each adder module are received by the second through m-th logical operation circuits within that adder module, respectively, as the low-level carry-in signals, the low-level carry-out signal outputted by the m-th carry-lookahead circuit within each adder module is outputted by that adder module as the high-level carry-out signal, the high-level carry-out signals outputted by the first through (k−1)-th adder modules are received by the second through k-th adder modules, respectively, as the high-level carry-in signals, and the outside carry-in signal is received by the first adder module as the high-level carry-in signal.

* * * * *